United States Patent
Chintalapalli Patta et al.

(10) Patent No.: US 11,427,409 B2
(45) Date of Patent: Aug. 30, 2022

(54) APPARATUS AND METHOD FOR PACKING HETEROGENEOUS OBJECTS

(71) Applicant: Tata Consultancy Services Limited, Mumbai (IN)

(72) Inventors: Venkat Raju Chintalapalli Patta, Bangalore (IN); Aniruddha Singhal, Noida (IN); Venkatesh Prasad Bangalore Srinivas, Bangalore (IN); Aditya Jain, Noida (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 17/174,383

(22) Filed: Feb. 12, 2021

(65) Prior Publication Data

US 2021/0403249 A1    Dec. 30, 2021

(30) Foreign Application Priority Data

Jun. 24, 2020   (IN) .............................. 202021026781

(51) Int. Cl.
  *B65G 47/48*   (2006.01)
  *B65G 1/04*    (2006.01)
  *B65G 47/88*   (2006.01)

(52) U.S. Cl.
  CPC ......... *B65G 47/485* (2013.01); *B65G 1/0464* (2013.01); *B65G 47/8815* (2013.01);
  (Continued)

(58) Field of Classification Search
  CPC .............. B65G 47/485; B65G 47/8815; B65G 1/0464; B65G 57/02; B65G 57/245;
  (Continued)

(56) References Cited

U.S. PATENT DOCUMENTS

| | | | | |
|---|---|---|---|---|
| 3,150,786 A | * | 9/1964 | Pratt | B65G 57/245 |
| | | | | 414/790.7 |
| 4,250,690 A | * | 2/1981 | Lorenzen | B65G 69/16 |
| | | | | 53/503 |

(Continued)

FOREIGN PATENT DOCUMENTS

| | | | |
|---|---|---|---|
| DE | 102019200723 A1 | * | 7/2020 |
| EP | 3 601 108 A1 | | 2/2020 |

(Continued)

*Primary Examiner* — William R Harp
(74) *Attorney, Agent, or Firm* — Finnegan, Henderson, Farabow, Garrett & Dunner LLP

(57) ABSTRACT

Embodiments herein provide automated bin packing of heterogeneous objects to fill maximum number of objects in an available bin space in an efficient manner. Conventional methods are less efficient in packing heterogeneous objects in a space and time efficient manner. The apparatus receives a plurality of 3D objects through a primary conveyor and diverts each of the plurality of 3D objects to an identified cuboidal bin through a corresponding secondary conveyor. Each of the plurality of 3D objects are diverted based on a tracking code associated with each of the plurality of 3D objects and a computed available bin space of the identified cuboidal bin corresponding to each of the plurality of 3D objects. Here the available bin space is computed based on a bin space information received from a corresponding bin vision sensor and a corresponding state space of the identified cuboidal bin.

10 Claims, 24 Drawing Sheets

(52) U.S. Cl.
CPC ........... *B65G 2203/0216* (2013.01); *B65G 2203/0225* (2013.01); *B65G 2203/041* (2013.01); *B65G 2811/0657* (2013.01)

(58) Field of Classification Search
CPC ....... B65G 57/035; B65G 57/11; B65B 5/108; B65B 35/246; B65B 35/22; B65B 35/50
See application file for complete search history.

(56) References Cited

U.S. PATENT DOCUMENTS

| | | | |
|---|---|---|---|
| 4,965,982 A | 10/1990 | Jesperson et al. | |
| 5,794,415 A * | 8/1998 | Huff | B65B 25/046 53/448 |
| 10,773,897 B2 * | 9/2020 | Schroader | B65G 47/54 |

FOREIGN PATENT DOCUMENTS

| | | |
|---|---|---|
| EP | 3 601 111 A1 | 2/2020 |
| WO | WO 2018/175294 A1 | 9/2018 |
| WO | WO 2018/175910 A1 | 9/2018 |

* cited by examiner

APPARATUS AND METHOD FOR PACKING HETEROGENEOUS OBJECTS

PRIORITY CLAIM

This U.S. patent application claims priority under 35 U.S.C. § 119 to: India Application No. 202021026781, filed on Jun. 24, 2020. The entire contents of the aforementioned application are incorporated herein by reference.

TECHNICAL FIELD

The disclosure herein generally relates to the field of automated packing and, more particular, to an apparatus and method for packing heterogeneous objects.

BACKGROUND

Automated bin packing is a very essential application in our day today life and the objective of automated bin packing is to fill maximum number of objects in an available bin space in an efficient manner. For example, in postal companies the dimension of parcels varies dramatically and packing such parcels in an efficient way is challenging. Conventional methods mainly use robotic based bin packing which direct drops the objects inside the bin. The direct dropping method is less efficient in space utilization since the fill percentage is very less. For example, approximately 50 percentage of the bins packed using direct drop method is empty, which is a huge loss to stakeholders. Other automated methods are efficient in packing homogeneous objects. Further some applications utilizes manual bin packing where the filling efficiency is 70 to 80 percentage. However, the throughput is less and requires lot of manpower. Hence an automatic packing of heterogeneous objects in a time and space efficient manner is challenging.

SUMMARY

Embodiments of the present disclosure present technological improvements as solutions to one or more of the above-mentioned technical problems recognized by the inventors in conventional systems. For example, in one embodiment, a method for machine learning model testing and preventive measure recommendation is provided. The method includes receiving data pertaining to each of a plurality of 3D objects using a conveyor vision sensor associated with a primary conveyor, wherein the data comprising a length (l), a height (h), a width (w), a tracking code and an orientation of each of the plurality of 3D objects. The method further includes computing a dimension associated with each of the plurality of 3D objects based on the data. Furthermore, the method includes simultaneously identifying a cuboidal bin, corresponding to each of the plurality of 3D objects, from a plurality of cuboidal bins corresponding to each of a plurality of secondary conveyors by comparing the tracking code of each of plurality of 3D object with a code number of the each of the plurality of cuboidal bins. Each of the plurality of cuboidal bins is associated with a length (L), a width (W), a height (H) and the code number. The height (H) is segmented into a plurality of parts (p) based on one of, a height distribution of 3D objects and an associated expert knowledge. A plurality of layers corresponding to each of the plurality of cuboidal bins are determined based on the plurality of parts. Each of the plurality of layers is associated with a corresponding state space forming a plurality of state spaces corresponding to each of the plurality of cuboidal bins. A plurality of cells in each of the plurality of state spaces is determined by dividing each of the plurality of state space into a plurality of rows (m) and a plurality of columns (n), wherein a sum of the plurality of rows is equivalent to the width (W) and a sum of the plurality of columns is equivalent to the length (L). Each of the plurality of state spaces corresponding to each of the plurality of bins is initialized by filling each of the plurality of cells with zeros. Furthermore, the method includes simultaneously receiving a space availability data of the identified cuboidal bin using a corresponding bin vision sensor, wherein each of the plurality of cuboidal bins is associated with the corresponding bin vision sensor. Furthermore, the method includes simultaneously computing a dimension of an un-occupied space of the identified state space of the corresponding identified cuboidal bin based on the plurality of rows (m) and the plurality of columns (n) filled with zeros. Furthermore, the method includes computing an available bin space of the corresponding identified cuboidal bin based on the space availability data and the dimension of an un-occupied space. Furthermore, the method includes comparing the computed available bin space of the corresponding identified cuboidal bin and the dimension associated with the corresponding 3D object. Furthermore, the method includes diverting each of the plurality of 3D objects from the primary conveyor towards the corresponding un-occupied state space of the corresponding identified cuboidal bin through the corresponding secondary conveyor by the following steps: (i) raising a corresponding vertical plate of the primary conveyor nearer to the available bin space of the corresponding identified cuboidal bin; and (ii) dropping the corresponding 3D object on a free roller arrangement of a vertically movable horizontal frame of the corresponding identified bin, when the dimension of the available bin space of the corresponding identified cuboidal bin and the dimension of the corresponding 3D object matches. Furthermore, the method includes updating the corresponding occupied state space with ones based on the space availability data obtained from the bin vision sensor of the identified cuboidal bin after placing the 3D object. Finally, the method includes updating a position of the vertically movable horizontal frame of the identified bin to a next layer based on the plurality of parts, when the corresponding state space is occupied, wherein updating the position of the vertically movable horizontal frame of the identified cuboidal bin is continued until the corresponding identified cuboidal bin is full, wherein the free rolling fixture of the vertically movable horizontal frame retracts and a hanging part of a corresponding rolling shutter rolls up when the corresponding identified cuboidal bin is full.

In another aspect, an apparatus for packing heterogeneous objects is provided. The apparatus for packing heterogeneous objects includes a primary conveyor with a first end and a second end capable of receiving a plurality of 3 dimensional (3D) objects. The primary conveyor comprises a plurality of rollers and a plurality of vertical plates corresponding to each of the plurality of rollers. Each of the plurality of vertical plates are capable of raising and diverting each of the plurality of 3D objects to a corresponding secondary conveyor. A conveyor vision sensor attached at the first end of the primary conveyor capable of measuring a plurality of dimensions and an orientation of each of the plurality of 3D objects, wherein the conveyor vision sensor is capable of reading a tracking code associated with each of the plurality of 3D objects. The apparatus for packing heterogeneous objects further includes a plurality of telescopic secondary conveyors having a bin end and a primary conveyor end, wherein the bin end is associated with a rolling shutter arrangement, wherein the primary conveyor end is detachably attached with at least one side of the primary conveyor, and wherein each of the plurality of telescopic secondary conveyors and the primary conveyor are of equal height. The apparatus for packing heterogeneous objects further includes a scissor lift mechanism attached beneath the rolling shutter arrangement with an upper end supporting a vertically movable horizontal frame and a lower end fixed on a free rolling fixture capable of moving forward and backward directions with telescopic mechanism. The vertically movable horizontal frame is having a front end, a rear end and a middle part, wherein a portion between the front end and the middle part is capable of fitting inside a cuboidal bin without touching inner part the cuboidal bin. The portion between the front end and the middle part is a free roller capable of providing a gravity support to a dropped 3D object and capable of dropping the 3D objects into the corresponding cuboidal bin by rolling when the corresponding cuboidal bin is full. The free roller arrangement part is capable of moving freely between a maximum upper position and a maximum lower position inside the corresponding cuboidal bin without touching an inner part of the cuboidal bin. The portion between the middle part and the rear end is vacant, wherein a hanging part of the rolling shutter arrangement hangs in the vacant middle portion of the vertically movable horizontal frame by touching the middle part to avoid dropped 3D objects from falling out of a corresponding cuboidal bin. The vertically movable horizontal frame is capable of moving in both forward and backward directions in telescopic movement. The cuboidal bin corresponding to each of the plurality of telescopic secondary conveyor is associated with a corresponding code number. The cuboidal bin is placed at the bin end of the corresponding telescopic secondary conveyor. The top of the cuboidal bin is open for dropping 3D objects. One side of the cuboidal bin is open towards the bin end of the corresponding secondary conveyor through which the free roller arrangement part of the vertically movable horizontal frame is capable of moving freely between the maximum upper position and the maximum lower position inside the corresponding cuboidal bin without touching an inner part of the cuboidal bin. The apparatus for packing heterogeneous objects further includes a plurality of bin vision sensors corresponding to each cuboidal bin.

In yet another aspect, a computer program product including a non-transitory computer-readable medium having embodied therein a computer program for apparatus and method for packing heterogeneous objects is provided. The computer readable program, when executed on a computing device, causes the computing device to receive data pertaining to each of a plurality of 3D objects using a conveyor vision sensor associated with a primary conveyor, wherein the data comprising a length (l), a height (h), a width (w), a tracking code and an orientation of each of the plurality of 3D objects. Further, the computer readable program, when executed on a computing device, causes the computing device to compute a dimension associated with each of the plurality of 3D objects based on the data. Furthermore, the computer readable program, when executed on a computing device, causes the computing device to simultaneously identify a cuboidal bin, corresponding to each of the plurality of 3D objects, from a plurality of cuboidal bins corresponding to each of a plurality of secondary conveyors by comparing the tracking code of each of plurality of 3D object with a code number of the each of the plurality of cuboidal bins. Each of the plurality of cuboidal bins is associated with a length (L), a width (W), a height (H) and the code number. The height (H) is segmented into a plurality of parts (p) based on one of, a height distribution of 3D objects and an associated expert knowledge. A plurality of layers corresponding to each of the plurality of cuboidal bins are determined based on the plurality of parts. Each of the plurality of layers is associated with a corresponding state space forming a plurality of state spaces corresponding to each of the plurality of cuboidal bins. A plurality of cells in each of the plurality of state spaces is determined by dividing each of the plurality of state space into a plurality of rows (m) and a plurality of columns (n), wherein a sum of the plurality of rows is equivalent to the width (W) and a sum of the plurality of columns is equivalent to the length (L), and each of the plurality of state spaces corresponding to each of the plurality of bins is initialized by filling each of the plurality of cells with zeros. Furthermore, the computer readable program, when executed on a computing device, causes the computing device to simultaneously receive a space availability data of the identified cuboidal bin using a corresponding bin vision sensor, wherein each of the plurality of cuboidal bins is associated with the corresponding bin vision sensor. Furthermore, the computer readable program, when executed on a computing device, causes the computing device to simultaneously compute a dimension of an un-occupied space of the identified state space of the corresponding identified cuboidal bin based on the plurality of rows (m) and the plurality of columns (n) filled with zeros. Furthermore, the computer readable program, when executed on a computing device, causes the computing device to compute an available bin space of the corresponding identified cuboidal bin based on the space availability data and the dimension of an un-occupied space. Furthermore, the computer readable program, when executed on a computing device, causes the computing device to compare the computed available bin space of the corresponding identified cuboidal bin and the dimension associated with the corresponding 3D object. Furthermore, the computer readable program, when executed on a computing device, causes the computing device to divert each of the plurality of 3D objects from the primary conveyor towards the corresponding un-occupied state space of the corresponding identified cuboidal bin through the corresponding secondary conveyor by: (i) raising a corresponding vertical plate of the primary conveyor nearer to the available bin space of the corresponding identified cuboidal bin and (ii) dropping the corresponding 3D object on a free roller arrangement of a vertically movable horizontal frame of the corresponding identified bin, when the dimension of the available bin space of the corresponding identified cuboidal bin and the dimension of the corresponding 3D object matches. Furthermore, the computer readable program, when executed on a computing device, causes the computing device to update the corresponding occupied state space with ones based on the space availability data obtained from the bin vision sensor of the identified cuboidal bin after placing the 3D object. Finally, the computer readable program, when executed on a computing device, causes the computing device to update a position of the vertically movable horizontal frame of the identified bin to a next layer based on the plurality of parts, when the corresponding state space is occupied, wherein updating the position of the vertically movable horizontal frame of the identified cuboidal bin is continued until the corresponding identified cuboidal bin is full, wherein the free rolling fixture of the vertically movable horizontal frame retracts and a hanging part of a corresponding rolling shutter rolls up when the corresponding identified cuboidal bin is full.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1A:
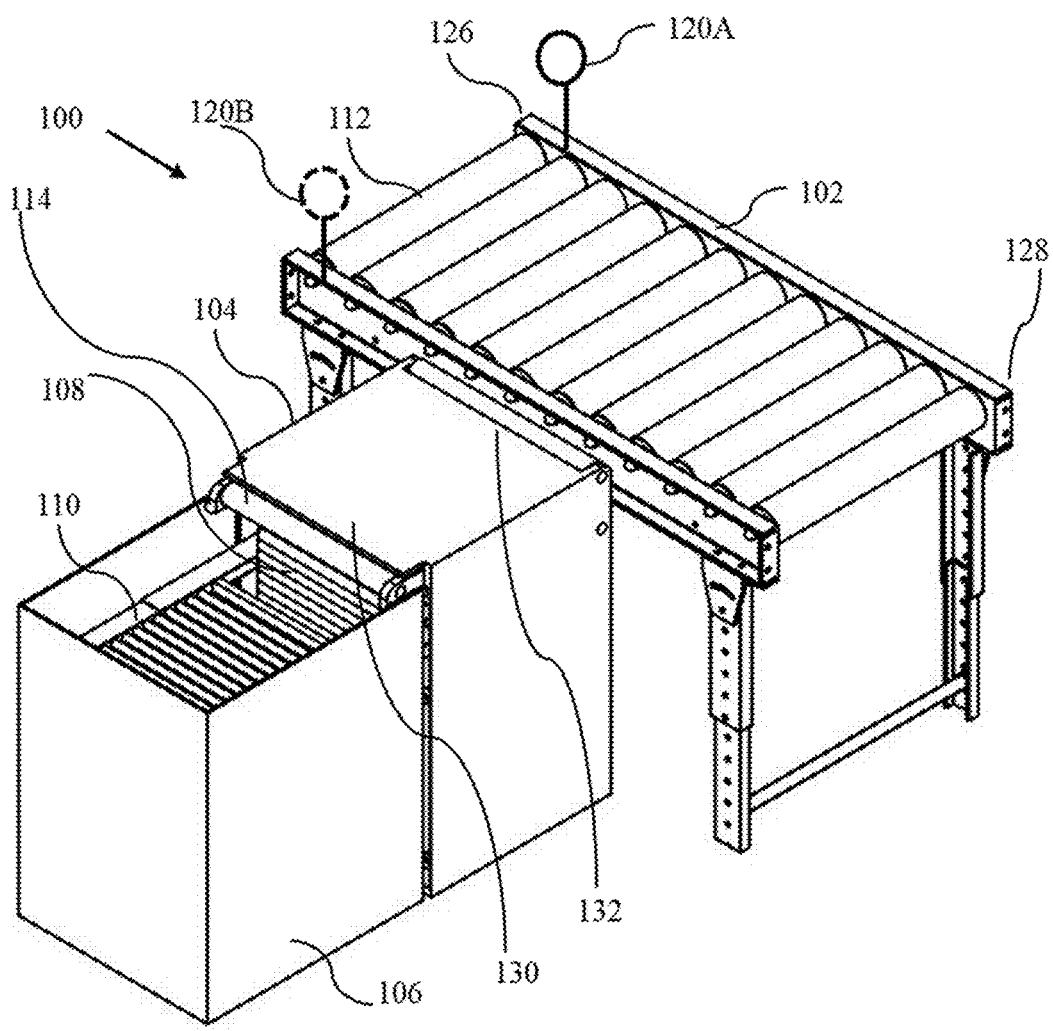
FIG. 1A illustrates a 3 Dimensional (3D) view of an apparatus for packing heterogeneous objects with one secondary conveyor and a corresponding cuboidal bin, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Embodiments herein provide an apparatus and method for packing heterogeneous objects to automatically pack heterogeneous 3 Dimensional (3D) objects in a space and time efficient manner. The apparatus includes a primary conveyor and a plurality of secondary conveyors arranged on both sides of the primary conveyor. Each of the plurality of secondary conveyor is having a corresponding cuboidal bin. The apparatus receives a plurality of 3D objects through the primary conveyor and diverts each of the plurality of 3D objects to an identified cuboidal bin through the corresponding secondary conveyor. Each of the plurality of 3D objects are diverted based on a tracking code of each of the plurality of 3D objects and a computed available bin space of the identified cuboidal bin. Here the available bin space is computed based on a bin space information received from a corresponding bin vision sensor of the identified cuboidal bin and a corresponding layered state space of the identified cuboidal bin.

Referring now to the drawings, and more particularly to FIGS. 1A through 10, where similar reference characters denote corresponding features consistently throughout the figures, there are shown preferred embodiments and these embodiments are described in the context of the following exemplary system and/or method.

FIG. 1A illustrates a 3D view of the apparatus for packing heterogeneous objects with one secondary conveyor and the corresponding cuboidal bin, in accordance with some embodiments of the present disclosure. The apparatus for packing heterogeneous objects 100 (also hereinafter referred as "packing apparatus 100" or apparatus 100). The packing apparatus 100 includes a primary conveyor 102, a secondary conveyor 104, a cuboidal bin 106, a conveyor vision sensor 120 A or 120 B. The conveyor vision sensor can be either 120 A or 120 B.

The primary conveyor 102 is having a first end 126 and a second end 128 and the primary conveyor 102 is capable of receiving the plurality of 3D objects. The primary conveyor 102 includes a plurality of rollers 112 and a plurality of vertical plates corresponding to each of the plurality of rollers (not shown in FIG. 1A). Each of the plurality of vertical plates are capable of raising and diverting each of the plurality of 3D objects to the corresponding secondary conveyor, for example, the secondary conveyor 104 as shown in FIG. 1A.

The conveyor vision sensor 120A or 120B, attached at the first end 126 of the primary conveyor 102 is capable of measuring a plurality of dimensions and an orientation of each of the plurality of 3D objects. Further, the conveyor vision sensor 120A is capable of reading a tracking code associated with each of the plurality of 3D objects. The tracking code is a one dimensional bar code or a two dimensional barcode.

Each telescopic secondary conveyor 104 is having a bin end 130 and a primary conveyor end 132. The bin end 130 is associated with a rolling shutter arrangement 114, a rolled down shutter 108 and a vertically movable horizontal frame 110. The primary conveyor end 132 is detachably attached with at least one side of the primary conveyor 102. Each of the plurality of telescopic secondary conveyors and the primary conveyor are of same height.

Figure 1B:
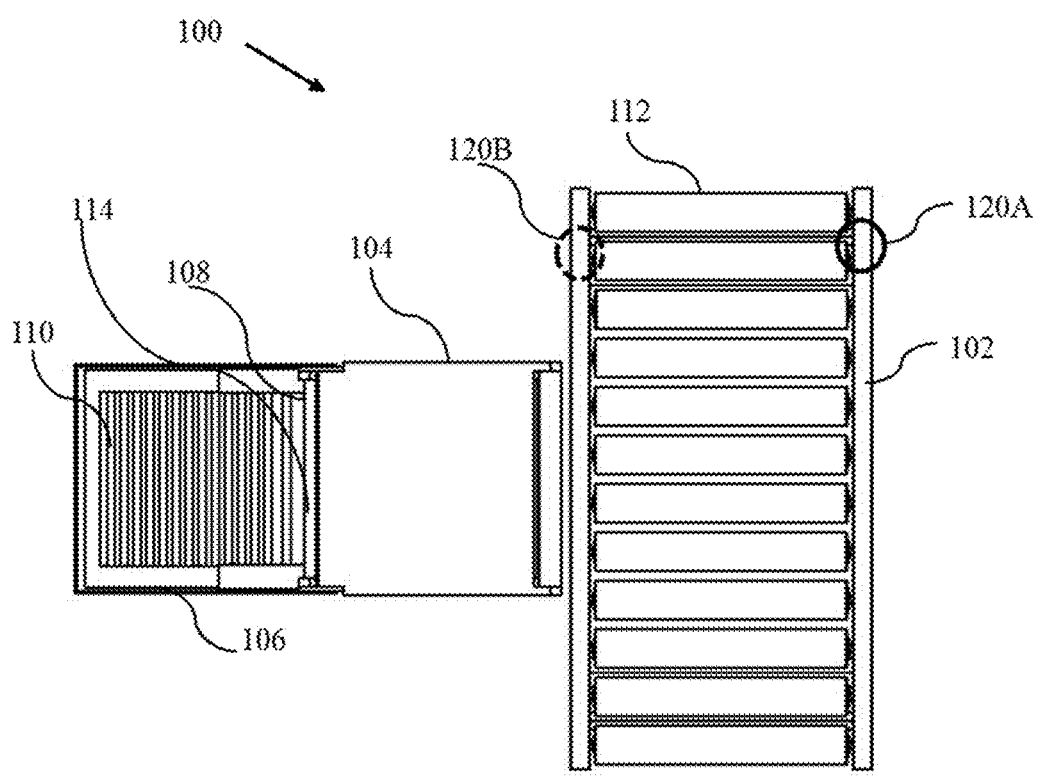
FIG. 1B illustrates a top view of the apparatus for packing heterogeneous objects with one secondary conveyor and the corresponding cuboidal bin, in accordance with some embodiments of the present disclosure.

FIG. 1B illustrates a top view of the apparatus for packing heterogeneous objects with one secondary conveyor and the corresponding cuboidal bin, in accordance with some embodiments of the present disclosure.

Figure 1C:
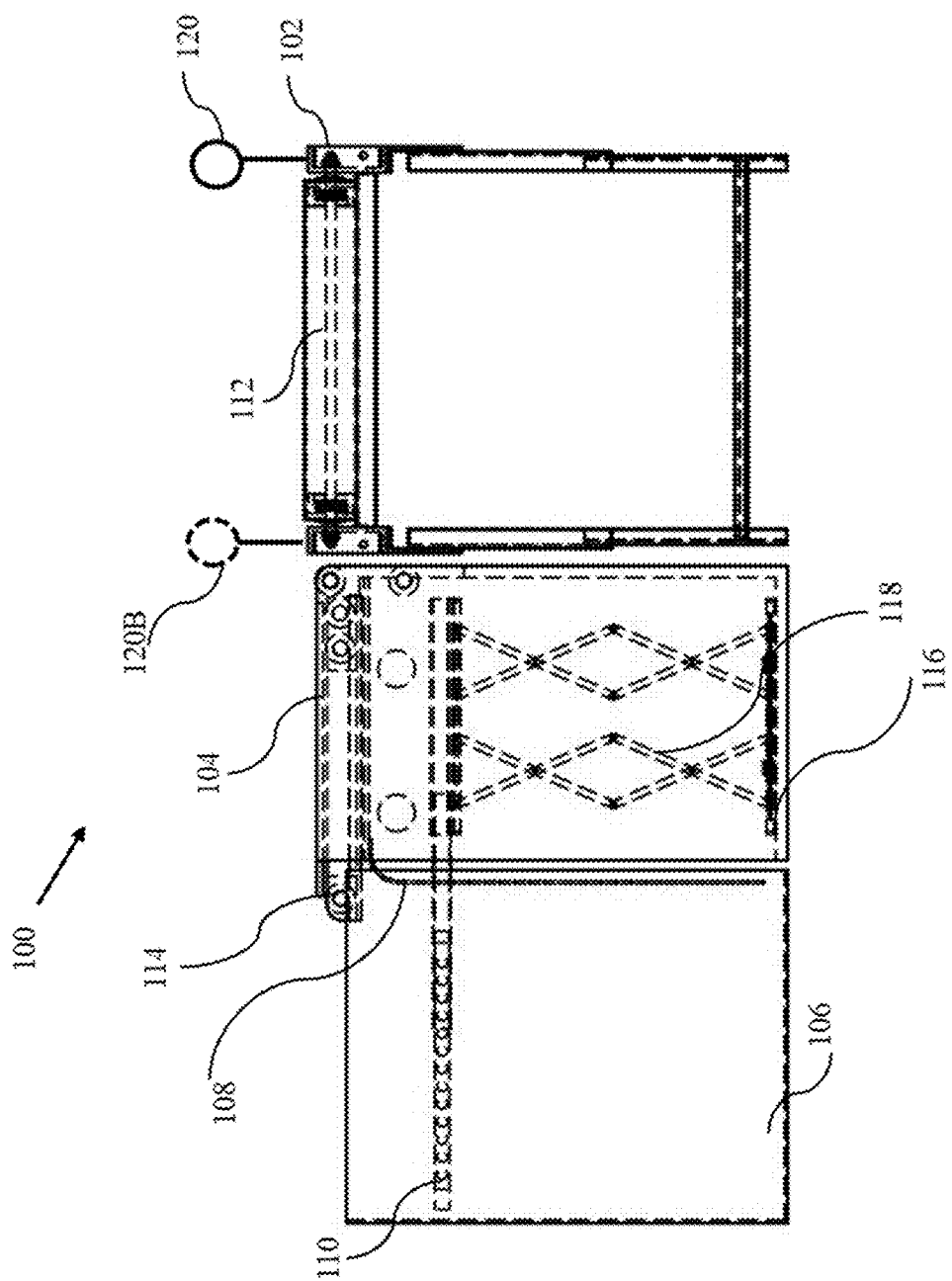
FIG. 1C illustrates a side view of the apparatus for packing heterogeneous objects with one secondary conveyor and the corresponding cuboidal bin, in accordance with some embodiments of the present disclosure.

FIG. 1C illustrates a side view of the apparatus for packing heterogeneous objects with one secondary conveyor and the corresponding cuboidal bin, in accordance with some embodiments of the present disclosure. Now referring to FIG. 1C, each secondary conveyor 104 of the apparatus 100 includes a scissor lift mechanism 118 attached beneath the rolling shutter arrangement (114) with an upper end supporting the vertically movable horizontal frame 110 and a lower end fixed on a free rolling fixture 116 capable of moving forward and backward directions with telescopic mechanism.

Figure 2A:
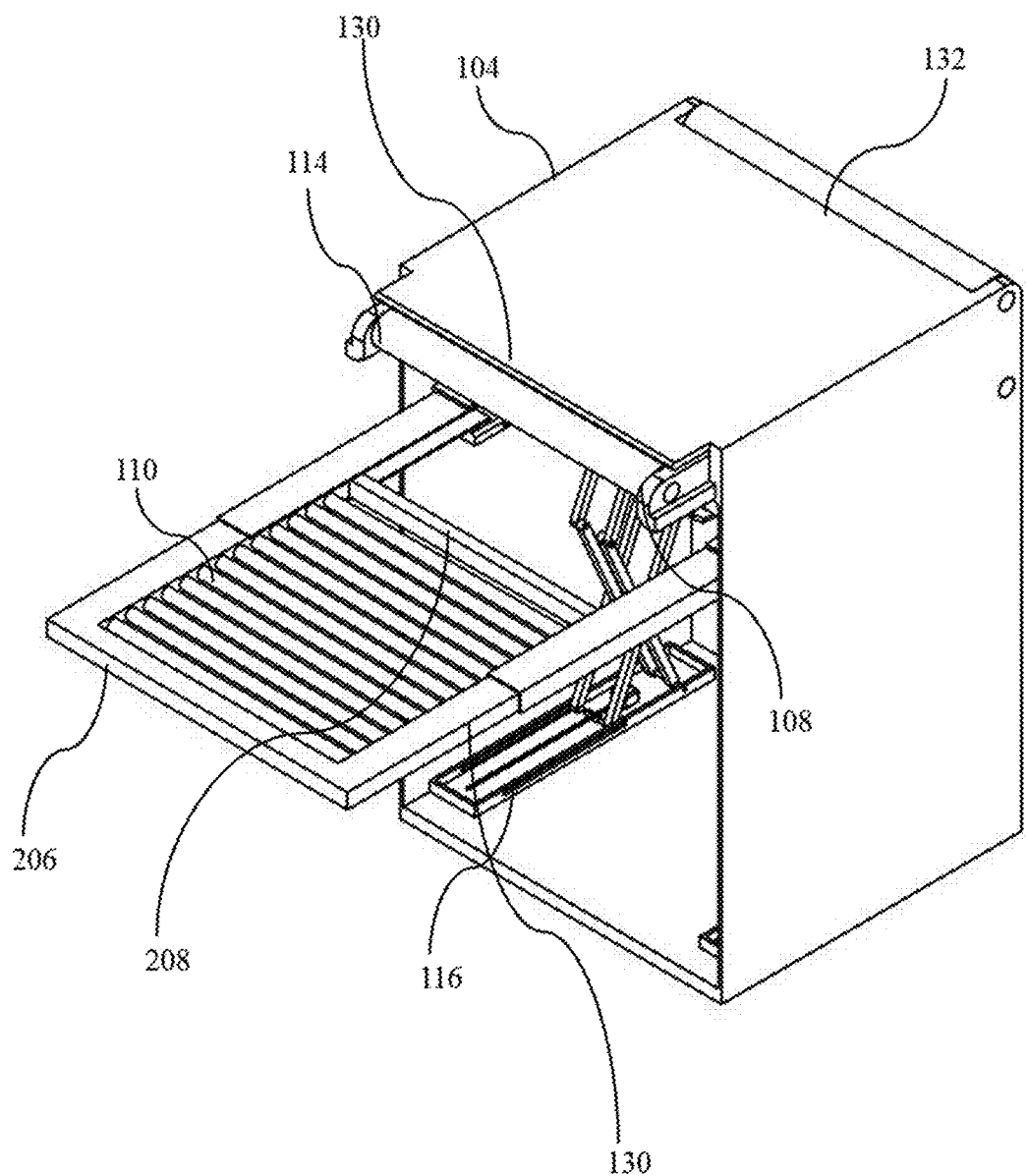
FIG. 2A illustrates a 3D view of a secondary conveyor of FIG. 1A with a rolled up shutter and an extended vertically movable horizontal frame, in accordance with some embodiments of the present disclosure.

FIG. 2A illustrates a 3D view of a secondary conveyor of FIG. 1A with a rolled up shutter and an extended vertically movable horizontal frame 110, in accordance with some embodiments of the present disclosure. The vertically movable horizontal frame 110 is having a front end 206, a rear end 210 (shown in FIG. 2C) and a middle part 208. The portion between the front end 206 and the middle part 208 is capable of fitting inside a cuboidal bin without touching inner part of the cuboidal bin. The portion between the front end 206 and the middle part 208 is a free roller arrangement, capable of providing a gravity support to the dropped 3D objects and capable of dropping each of the plurality of 3D objects by rolling. The free roller arrangement part is capable of moving freely between a maximum upper position and a maximum lower position inside the corresponding cuboidal bin without touching an inner part of the bin. The top of the cuboidal bin is open for dropping 3D objects. A plurality of bin vision sensors are fixed corresponding to each cuboidal bin.

The portion between the middle part 208 and the rear end 210 (shown in FIG. 2C) is vacant, wherein a hanging part of the rolling shutter arrangement hangs in the vacant middle portion of the vertically movable horizontal frame by touching middle part 208 to avoid the dropped 3D objects from falling out of a corresponding cuboidal bin. The vertically movable horizontal frame 110 is capable of moving in both forward and backward directions in telescopic movement.

Figure 2B:
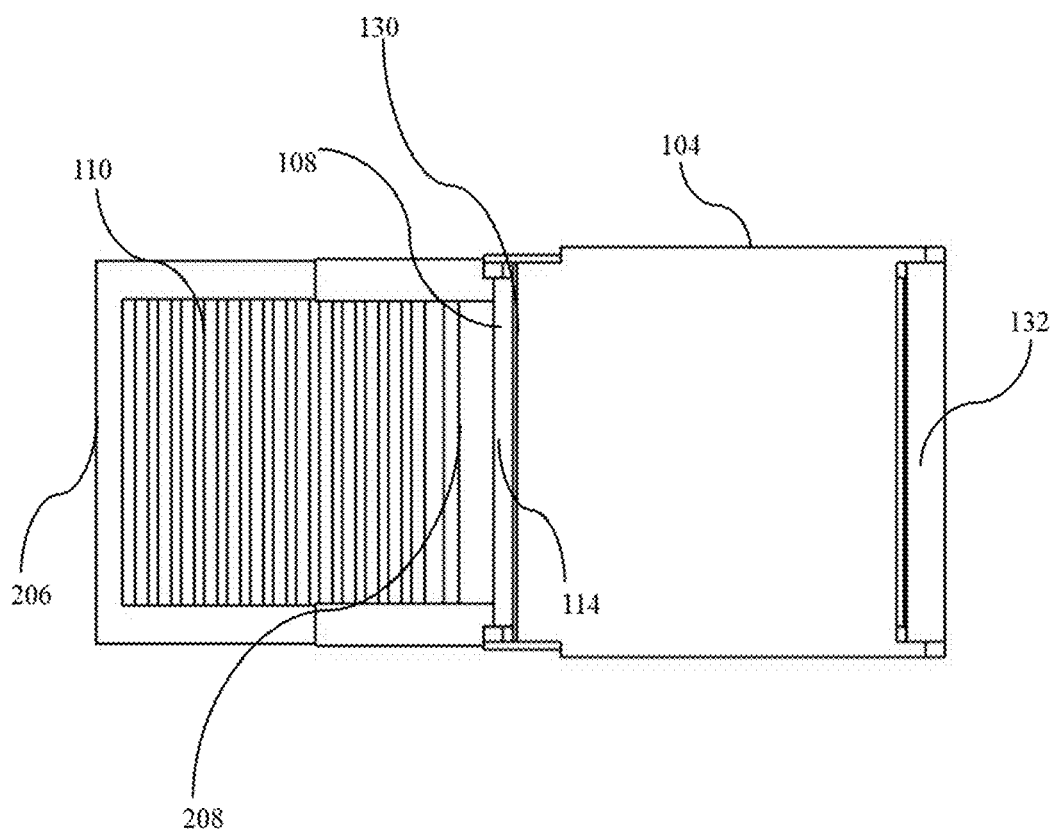
FIG. 2B illustrates a top view of the secondary conveyor of FIG. 1A with the rolled up shutter and the extended vertically movable horizontal frame, in accordance with some embodiments of the present disclosure.

FIG. 2B illustrates a top view of the secondary conveyor of FIG. 1A with the rolled up shutter and the extended vertically movable horizontal frame 110, in accordance with some embodiments of the present disclosure.

Figure 2C:
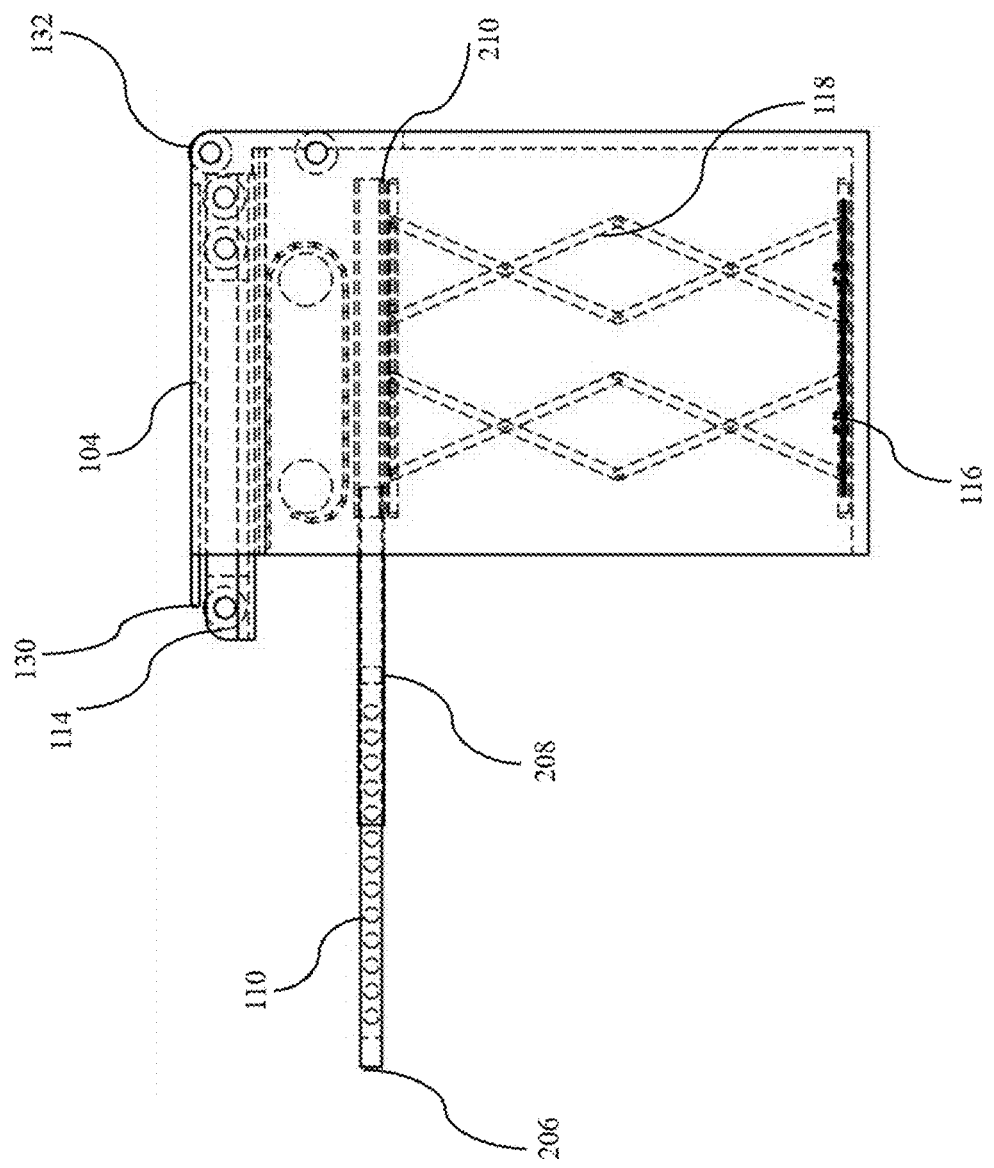
FIG. 2C illustrates a side view of the secondary conveyor of FIG. 1A with the rolled up shutter and the extended vertically movable horizontal frame, in accordance with some embodiments of the present disclosure.
Figure 3A:
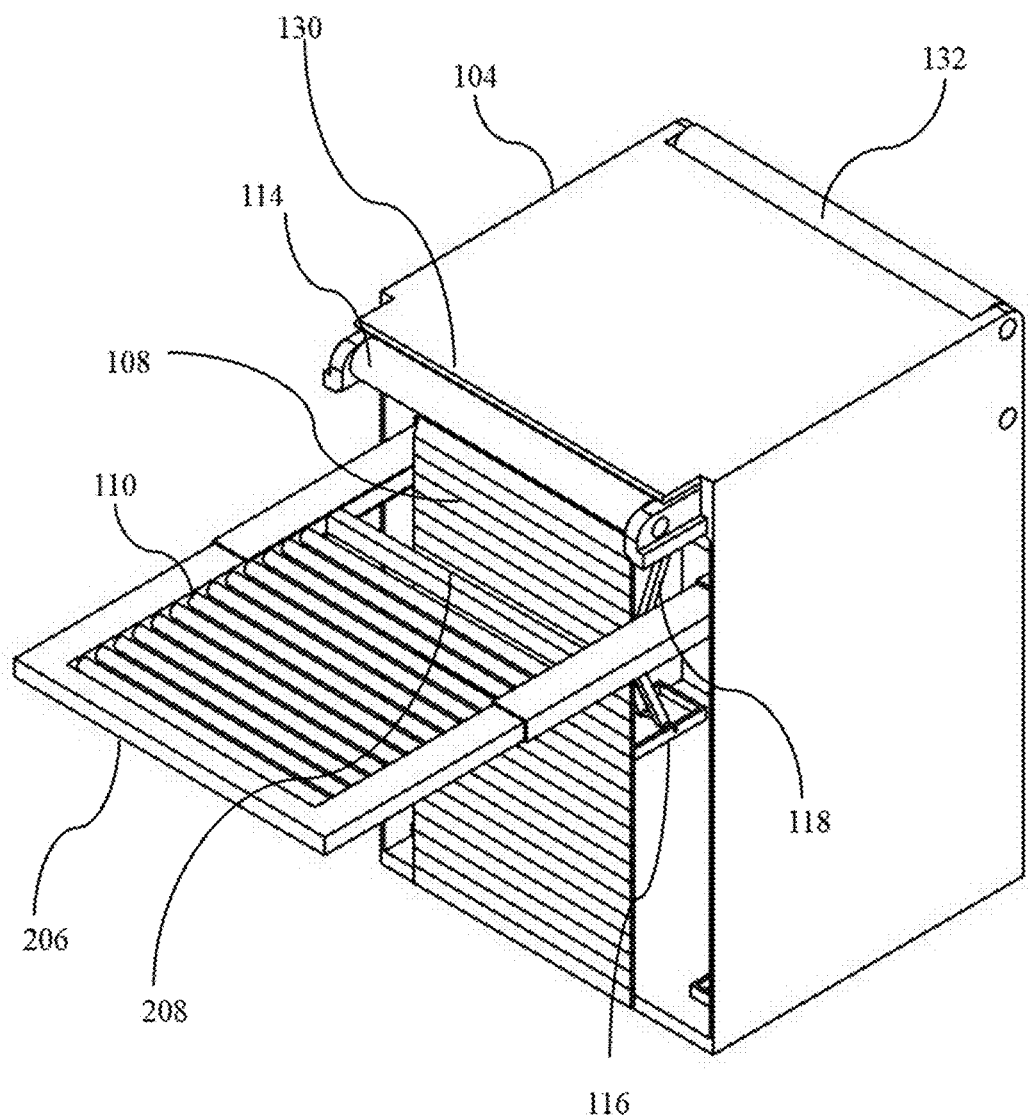
FIG. 3A illustrates a 3D view of the secondary conveyor of FIG. 1A with a rolled down shutter and the extended vertically movable horizontal frame, in accordance with some embodiments of the present disclosure.

FIG. 2C illustrates a side view of the secondary conveyor of FIG. 1A with the rolled up shutter and the extended vertically movable horizontal frame, in accordance with some embodiments of the present disclosure. The rear end 210 of the vertically movable horizontal frame 110 is shown in FIG. 2C FIG. 3A illustrates a 3D view of the secondary conveyor of FIG. 1A with a rolled down shutter 108 and the extended vertically movable horizontal frame 110, in accordance with some embodiments of the present disclosure. Now referring to FIG. 3A, the portion between the middle part 208 and the rear end 210 is vacant, wherein the hanging part 108 of the rolling shutter arrangement 114 hangs in the vacant middle portion of the vertically movable horizontal frame 110 by touching the middle part 208 to avoid dropped 3D objects from falling out of a corresponding cuboidal bin.

Figure 3B:
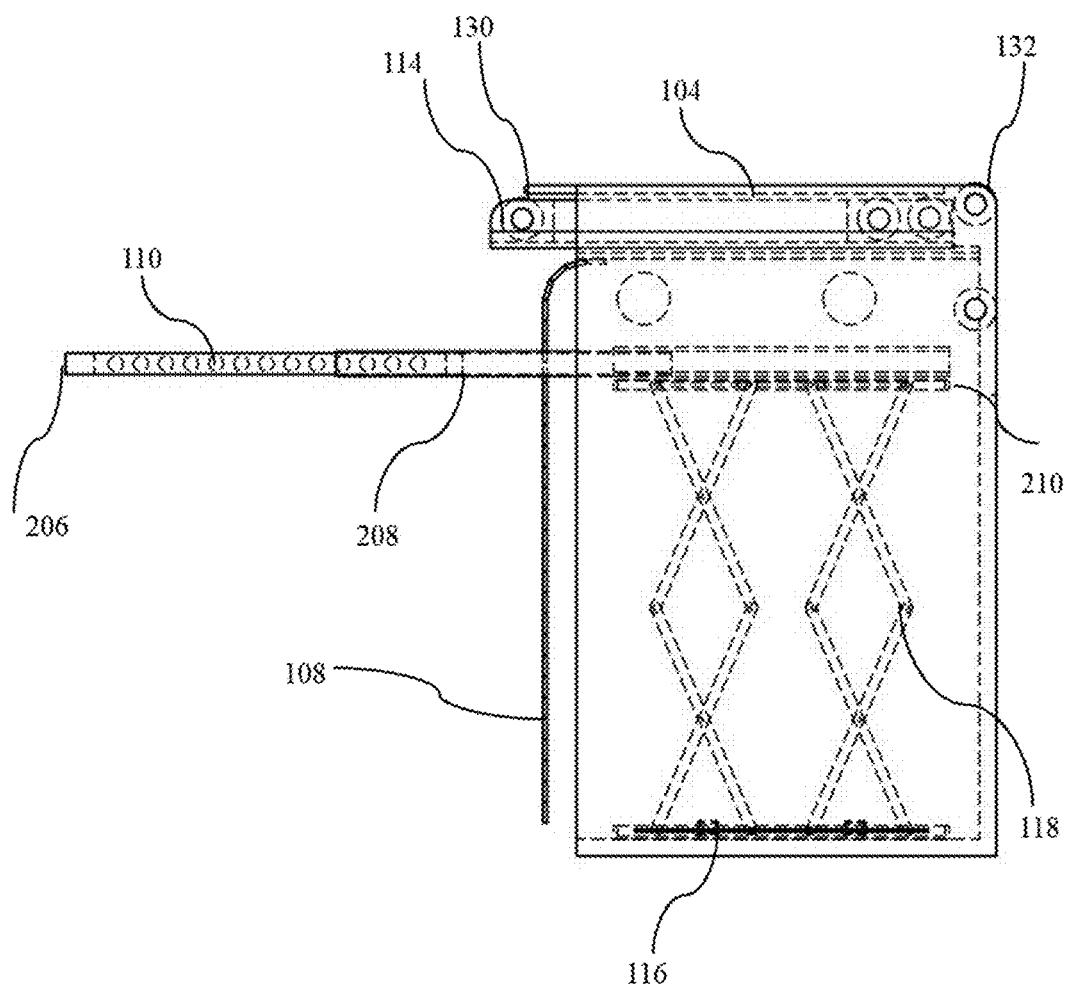
FIG. 3B illustrates a side view of the secondary conveyor of FIG. 1A with the rolled down shutter and the extended vertically movable horizontal frame, in accordance with some embodiments of the present disclosure.

FIG. 3B illustrates a side view of the secondary conveyor of FIG. 1A with the rolled down shutter and the extended vertically movable horizontal frame, in accordance with some embodiments of the present disclosure. The hanging part 108 of the rolling shutter arrangement 114 hangs in the vacant middle portion of the vertically movable horizontal frame 110 by touching the middle part 208 to avoid each of the plurality of 3D objects from falling out of a corresponding cuboidal bin.

Figure 4A:
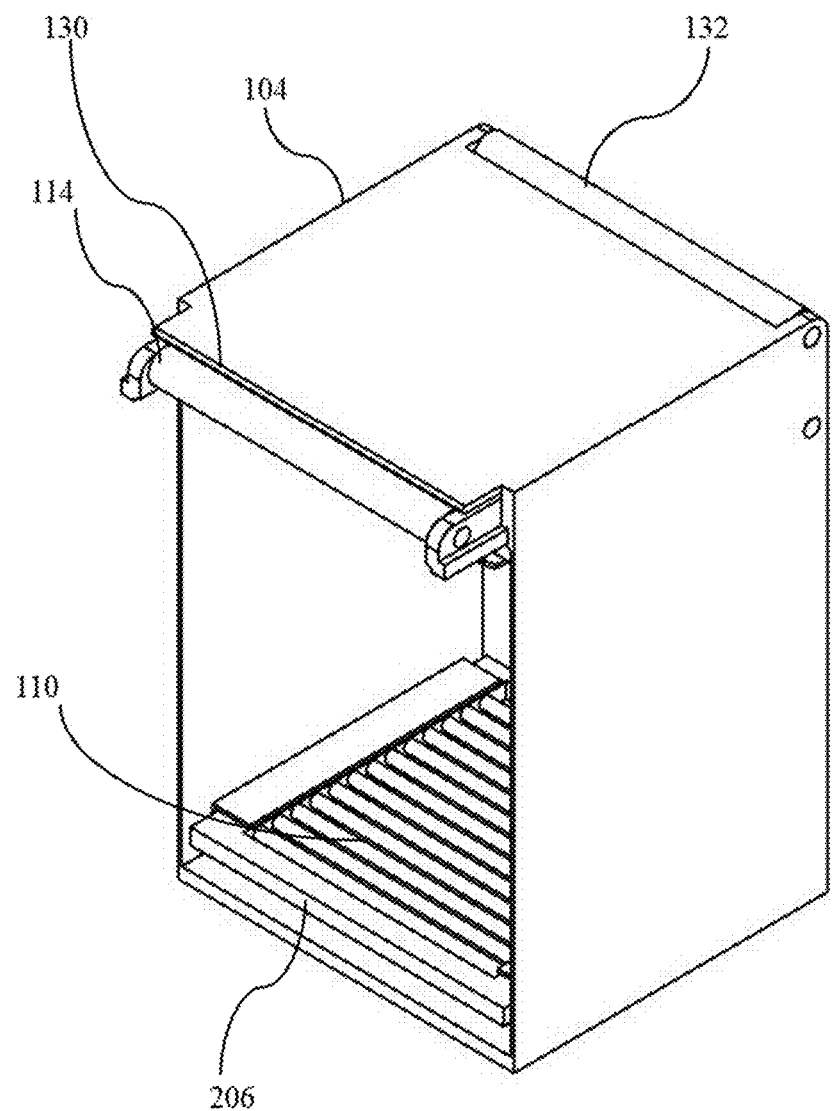
FIG. 4A illustrates a 3D view of the secondary conveyor of FIG. 1A with the rolled up shutter and the retracted vertically movable horizontal frame, in accordance with some embodiments of the present disclosure.

FIG. 4A illustrates a 3D view of the secondary conveyor of FIG. 1A with the rolled up shutter and the retracted vertically movable horizontal frame, in accordance with some embodiments of the present disclosure. The vertically movable horizontal frame 110 is retracted using the telescopic mechanism and the vertically movable horizontal frame 110 is resting in the maximum lower position by with the help of rolling fixture 116 shown in FIG. 3B. Here, the shutter is rolled up and kept inside the rolling shutter arrangement 114. The vertically movable horizontal frame 110 is retracted, when the corresponding cuboidal bin is full so that the 3D objects on the rolling portion of the vertically movable horizontal frame 110 is dropped in the corresponding cuboidal bin.

Figure 4B:
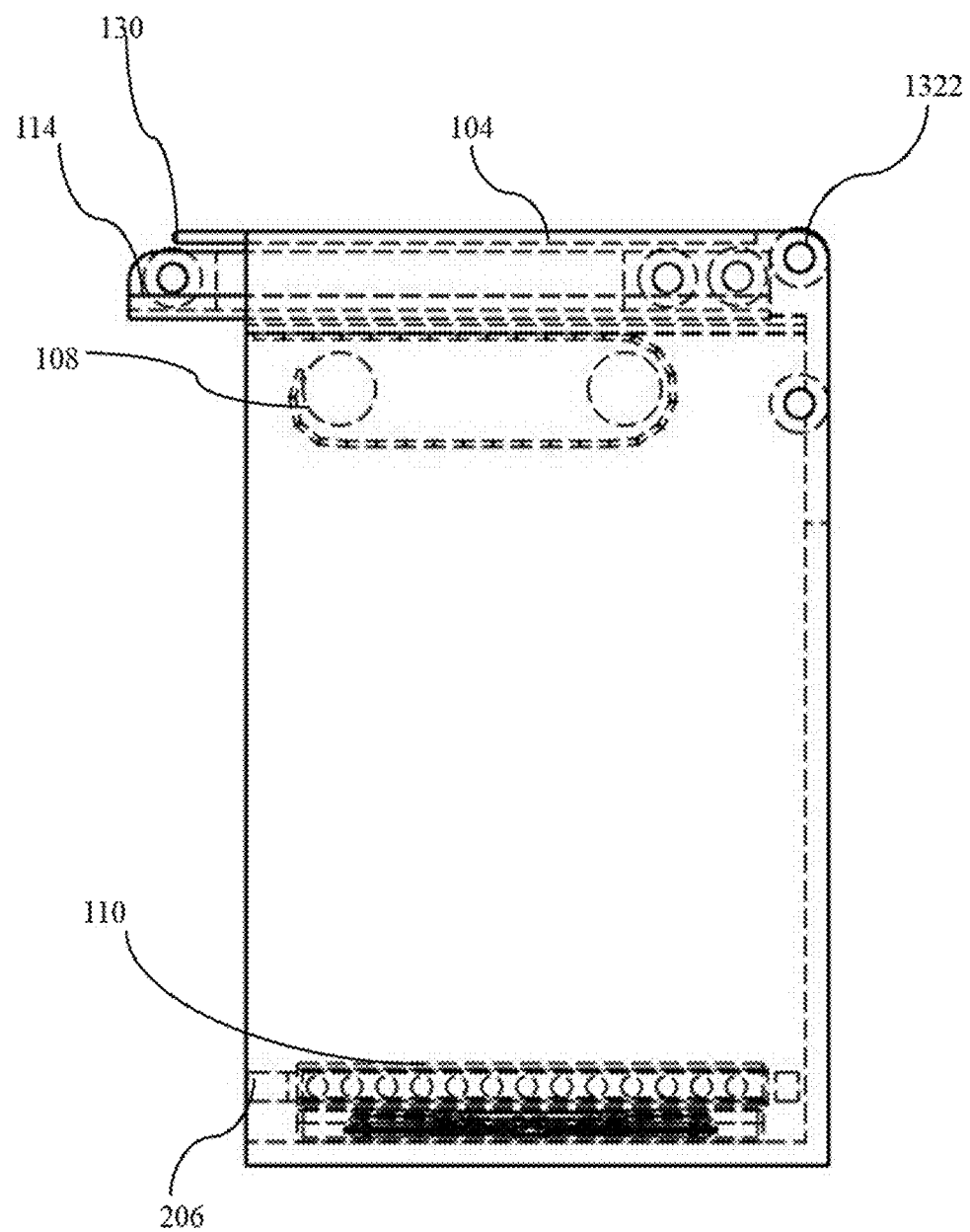
FIG. 4B illustrates a side view of the secondary conveyor of FIG. 1A with the rolled up shutter and the retracted vertically movable horizontal frame, in accordance with some embodiments of the present disclosure.

FIG. 4B illustrates a side view of the secondary conveyor of FIG. 1A with the rolled up shutter and the retracted vertically movable horizontal frame, in accordance with some embodiments of the present disclosure. The rolled up shutter 108 of the shutter arrangement 114 is shown in FIG. 4B. The shutter 108 is rolled up once the corresponding cuboidal bin is full.

Figure 5A:
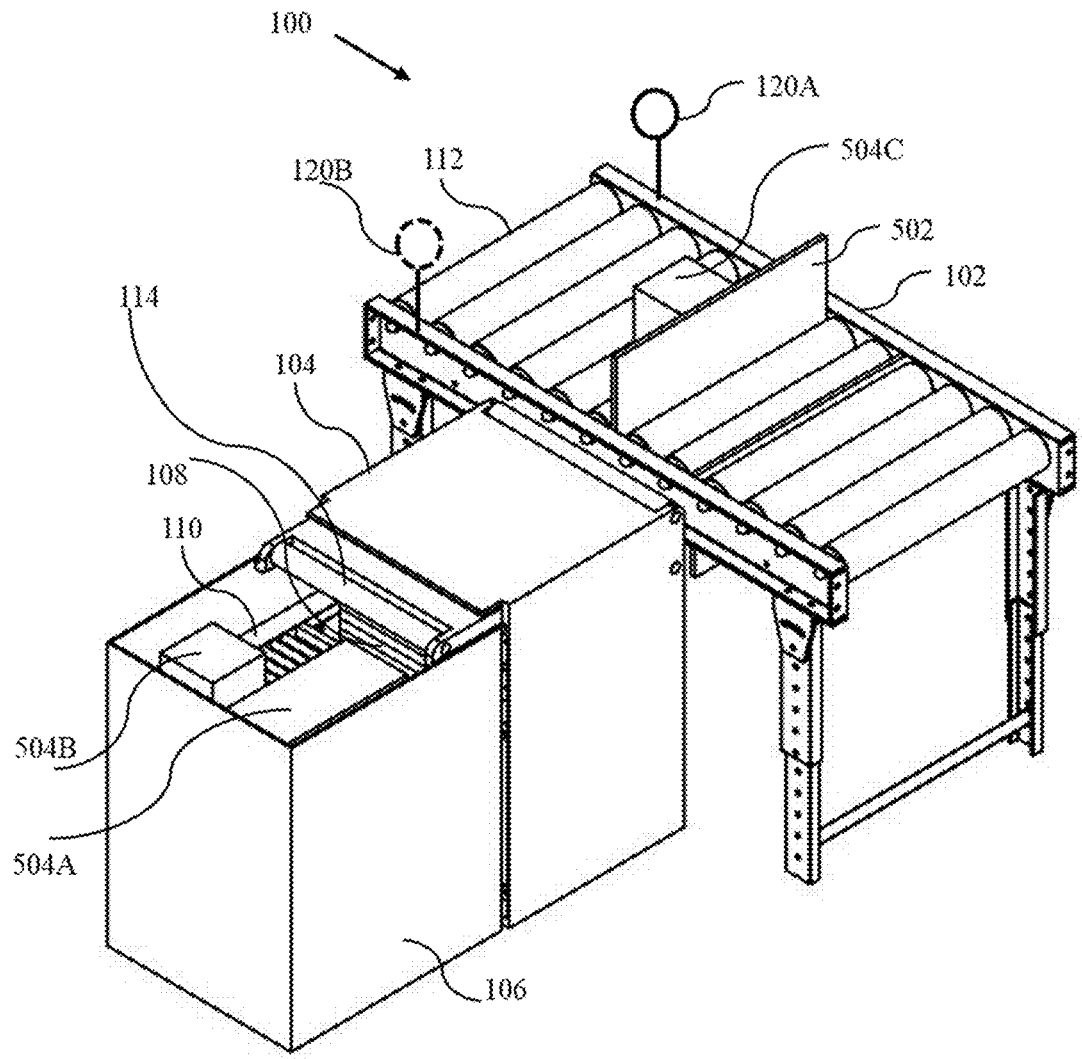
FIG. 5A illustrates a 3D view of the apparatus of FIG. 1A diverting a 3D object to a secondary conveyor by a vertical plate, in accordance with some embodiments of the present disclosure.
Figures 8A, 8B, 8C:
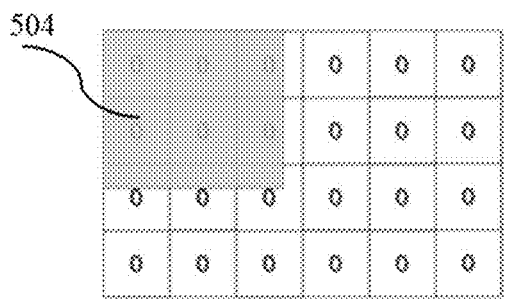
FIGS. 8A, 8B and 8C are exemplary state space representing available space of the cuboidal bin of the apparatus of FIG. 1A, in accordance with some embodiments of the present disclosure.

FIG. 5A illustrates a 3D view of the apparatus of FIG. 1A diverting a 3D object to a secondary conveyor by a vertical plate, in accordance with some embodiments of the present disclosure. The incoming 3D object 504 C is received by the primary conveyor 102 and simultaneously, the dimension, the orientation and the tracking code of the 3D object 504 C is computed by the primary vision sensor 120A. The tracking code is compared with the code number associated with each of the plurality of cuboidal bins and the corresponding cuboidal bin where the 3D object 504 C is to be dropped is identified. The identified cuboidal bin contains two 3D objects 504 A and 504 B. Further, bin space in the identified bin is computed by using a dimension of the corresponding unoccupied state space (as shown in FIG. 8A to 8C) and a space availability data from a corresponding bin sensor (not shown in FIG. 1A). If the dimension of the 3D object 504 C matches with the computed available bin space in the identified bin, a vertical plate 502 nearer to the computed available space is raised to divert the 3D object 504 C towards the corresponding secondary conveyor 104 of the identified bin 106. If the dimension of the 3D object 504 C does not match with the computed available bin space in the identified bin, another bin with matching the tracking code of the 504 C is identified and dropped using the said procedure.

Figure 5B:
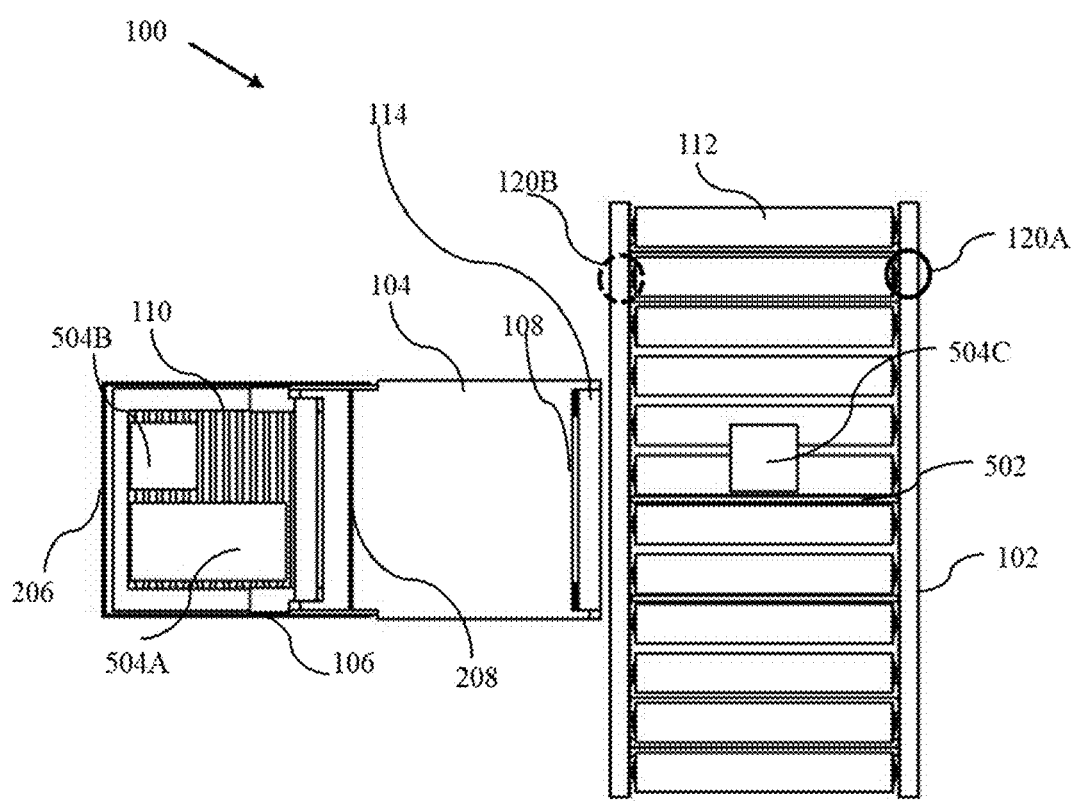
FIG. 5B illustrates a top view of the apparatus of FIG. 1A diverting the 3D object to the secondary conveyor by the vertical plate, in accordance with some embodiments of the present disclosure.

FIG. 5B illustrates a top view of the apparatus of FIG. 1A diverting the 3D object to the secondary conveyor by the vertical plate, in accordance with some embodiments of the present disclosure.

Figure 5C:
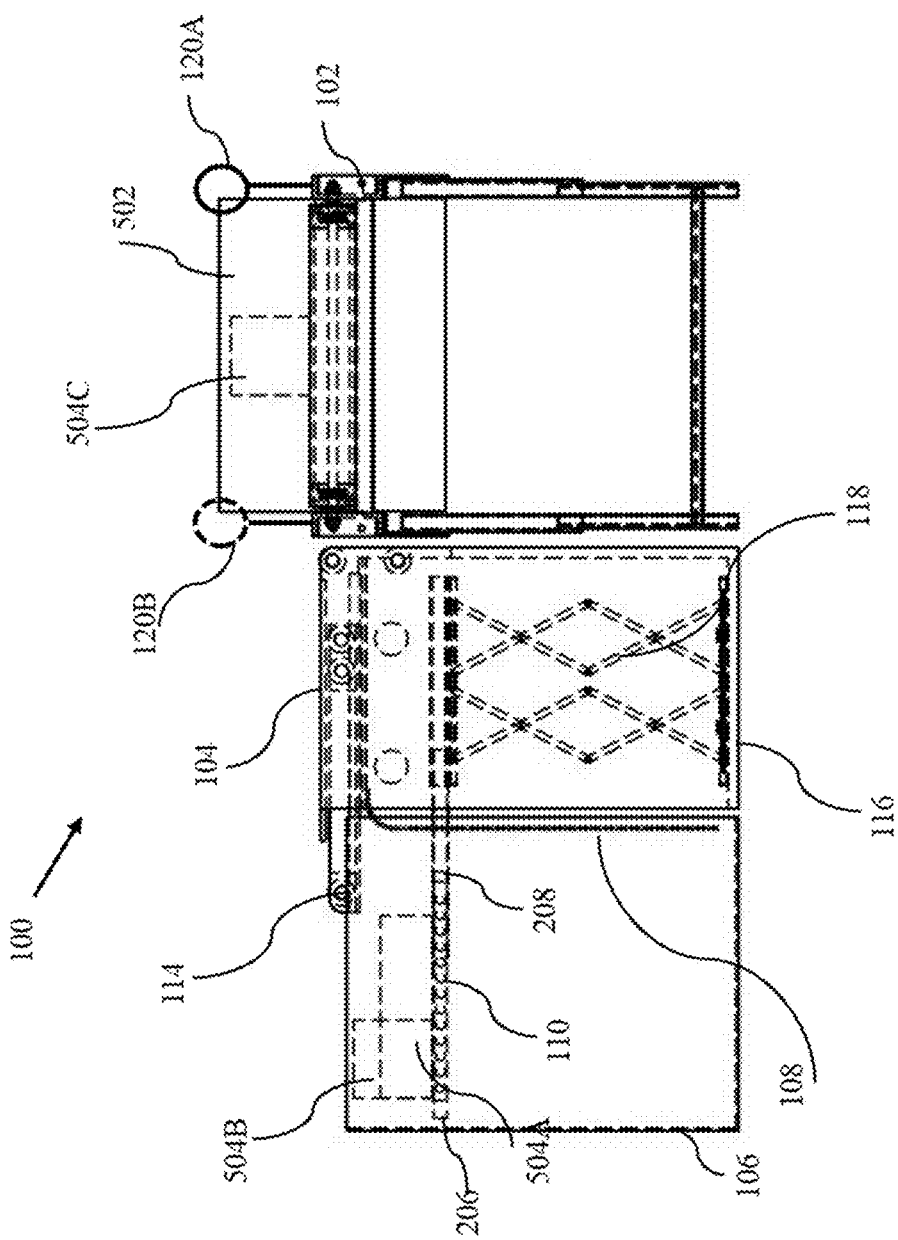
FIG. 5C illustrates a side view of the apparatus of FIG. 1A, diverting the 3D object to a secondary conveyor by a vertical plate, in accordance with some embodiments of the present disclosure.

FIG. 5C illustrates a side view of the apparatus of FIG. 1A, diverting the 3D object to a secondary conveyor by a vertical plate, in accordance with some embodiments of the present disclosure.

Figure 6A:
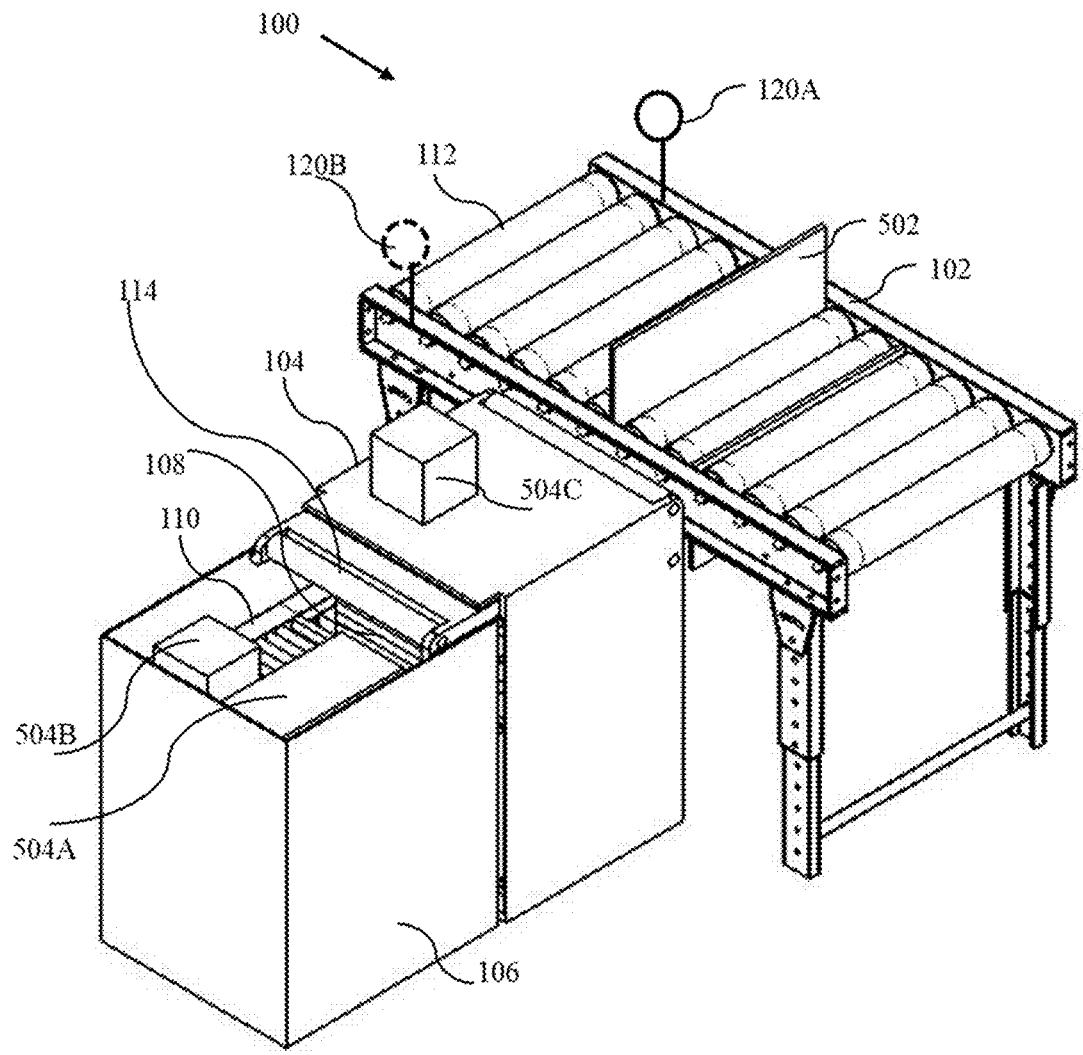
FIG. 6A illustrates a 3D view of the apparatus of FIG. 1A conveying the 3D object towards a cuboidal bin by the secondary conveyor, in accordance with some embodiments of the present disclosure.

FIG. 6A illustrates a 3D view of the apparatus of FIG. 1A conveying the 3D object towards a cuboidal bin by the secondary conveyor, in accordance with some embodiments of the present disclosure. Now referring to FIG. 6A, the 3D object 504 C is conveyed by the corresponding secondary conveyor towards the computed available bin space.

Figure 6B:
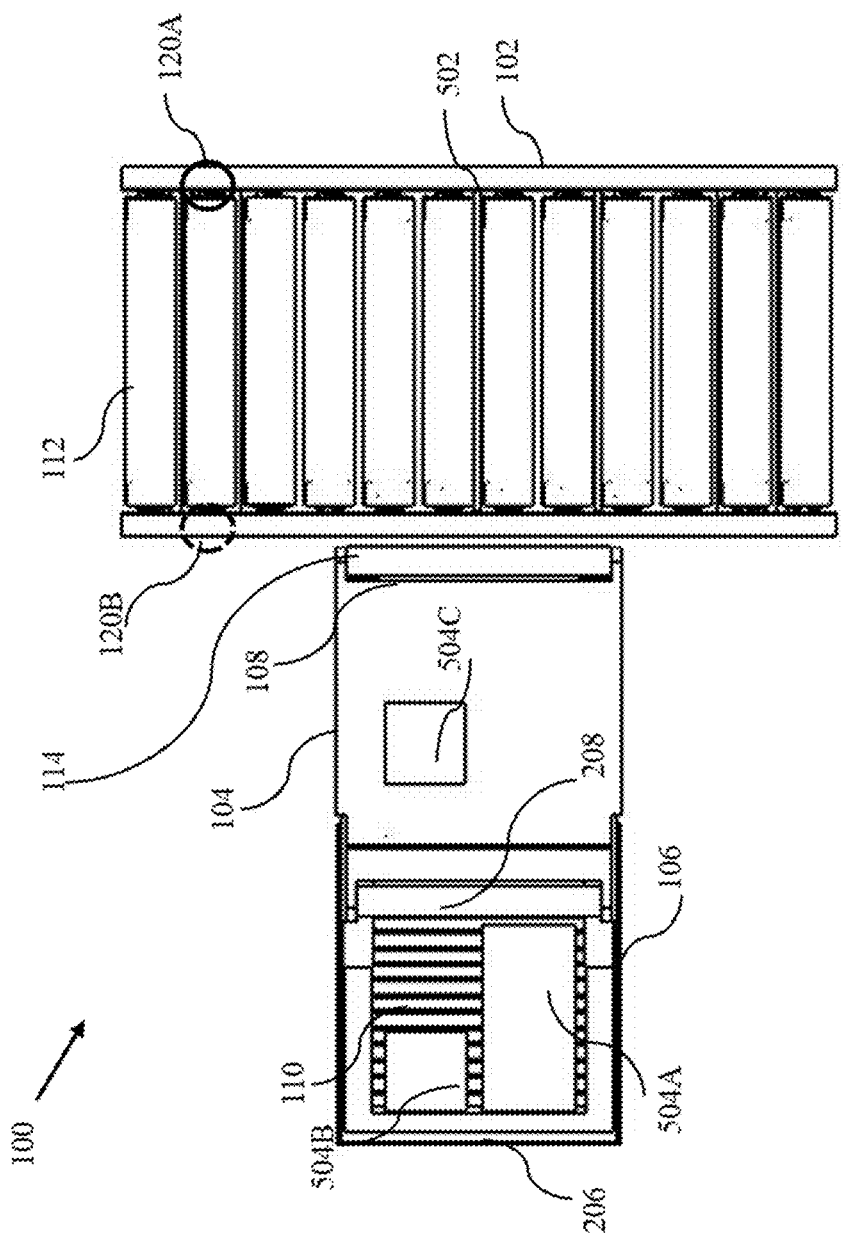
FIG. 6B illustrates a top view of the apparatus of FIG. 1A, conveying the 3D object towards the cuboidal bin by the secondary conveyor, in accordance with some embodiments of the present disclosure.

FIG. 6B illustrates a top view of the apparatus of FIG. 1A, conveying the 3D object towards the cuboidal bin by the secondary conveyor, in accordance with some embodiments of the present disclosure.

Figure 6C:
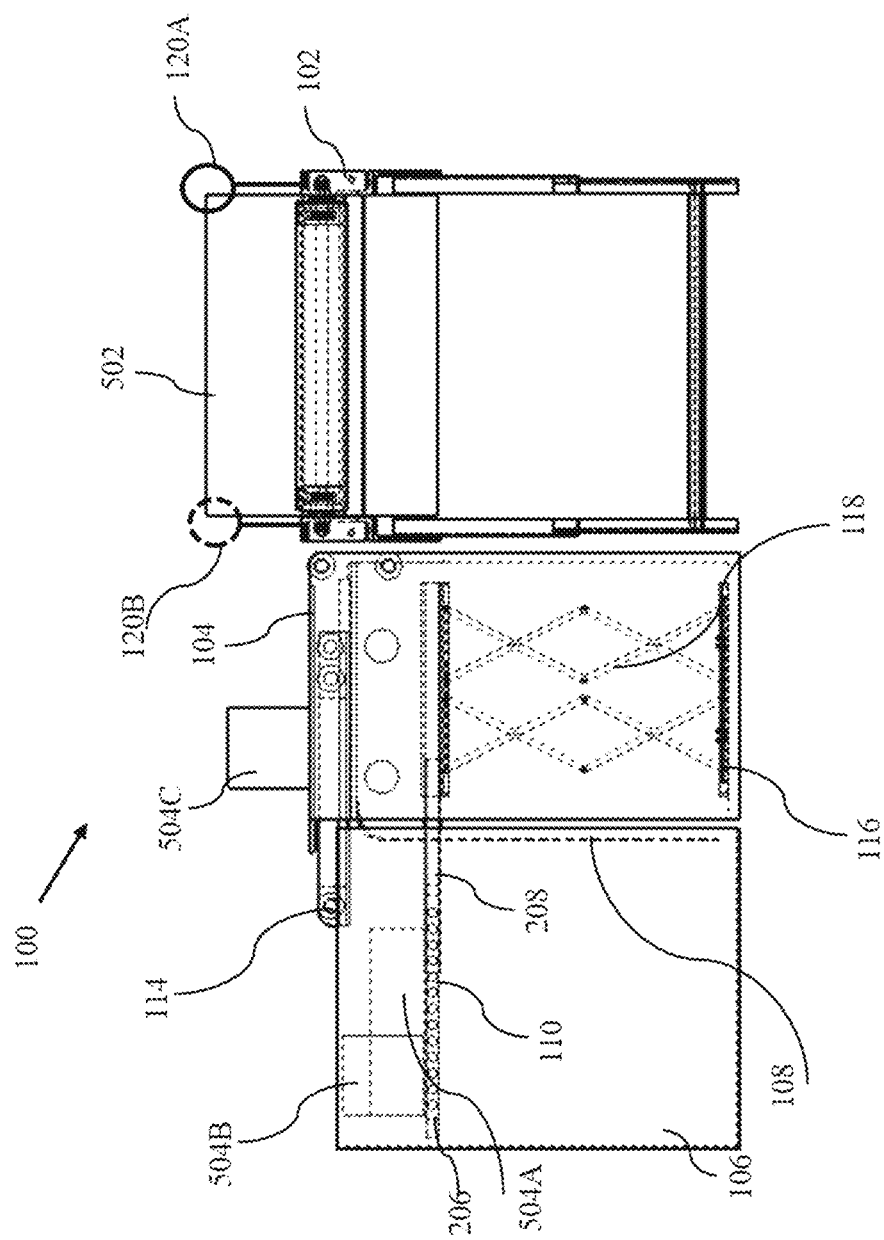
FIG. 6C illustrates a side view of the apparatus of FIG. 1A conveying the 3D object towards the cuboidal bin by the secondary conveyor, in accordance with some embodiments of the present disclosure.

FIG. 6C illustrates a side view of the apparatus of FIG. 1A conveying the 3D object towards the cuboidal bin by the secondary conveyor, in accordance with some embodiments of the present disclosure.

Figure 7A:
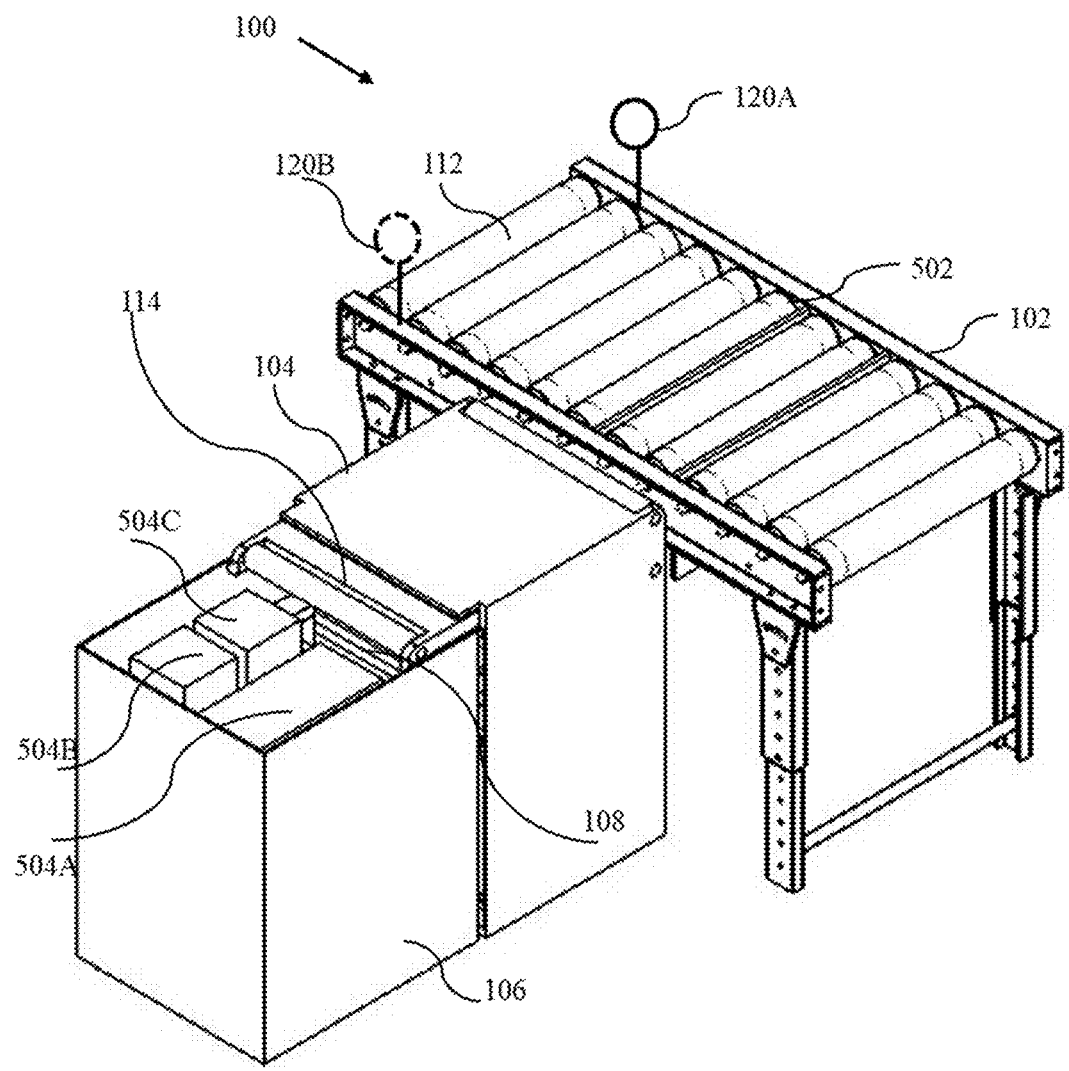
FIG. 7A illustrates a 3D view of the apparatus of FIG. 1A with a plurality of 3D objects dropped inside the cuboidal bin, in accordance with some embodiments of the present disclosure.

FIG. 7A illustrates a 3D view of the apparatus of FIG. 1A with a plurality of 3D objects dropped inside the cuboidal bin, in accordance with some embodiments of the present disclosure. Now referring to FIG. 7A, the 3D object 504 C is dropped into the available bin space by the secondary conveyor. Here, the 3D objects are 504 A, 504 B and 504 C are stopped from falling out of the bin by the rigid hanging part of the rolling shutter 108.

Figure 7B:
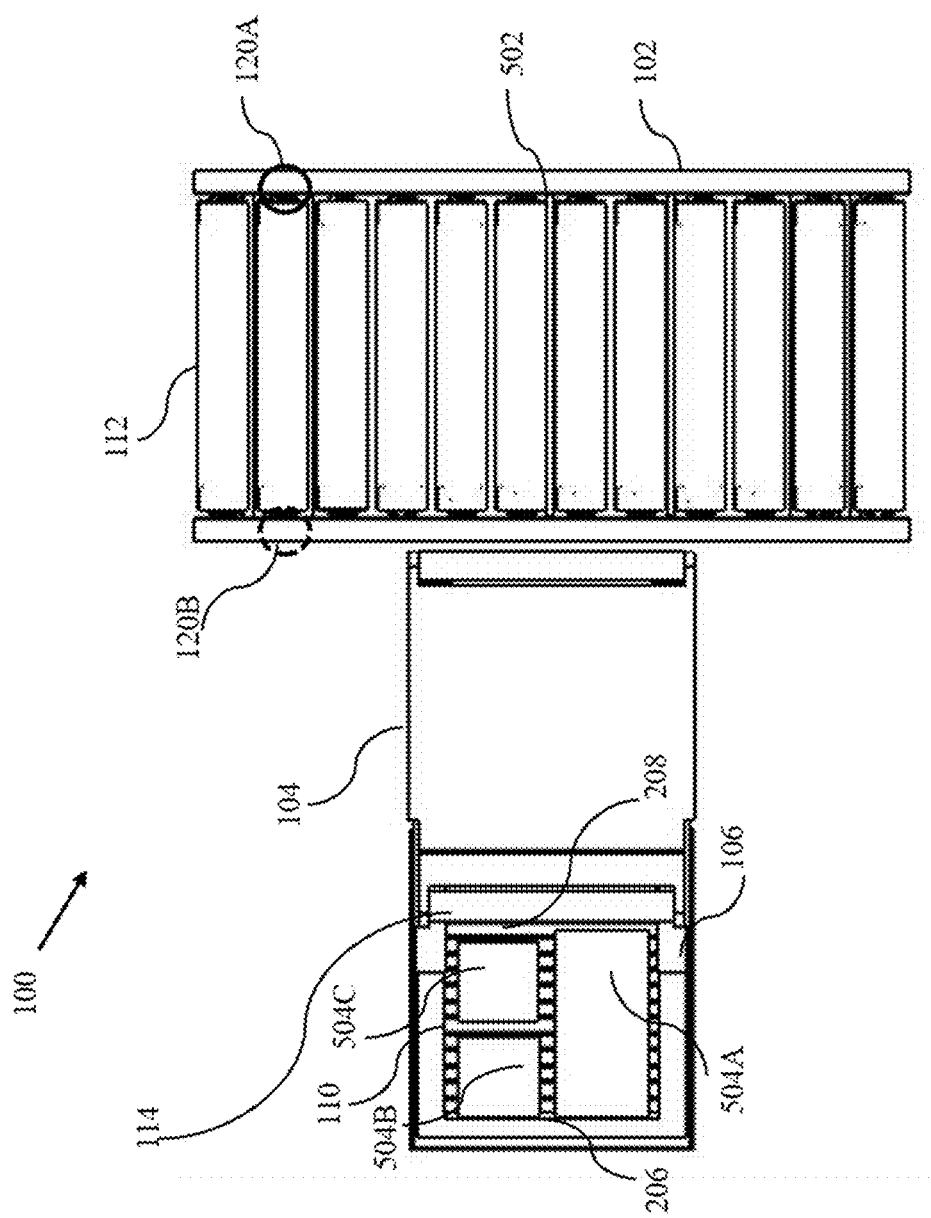
FIG. 7B illustrates a top view of the apparatus of FIG. 1A with the plurality of 3D objects dropped inside the cuboidal bin, in accordance with some embodiments of the present disclosure.

FIG. 7B illustrates a top view of the apparatus of FIG. 1A with the plurality of 3D objects dropped inside the cuboidal bin, in accordance with some embodiments of the present disclosure.

Figure 7C:
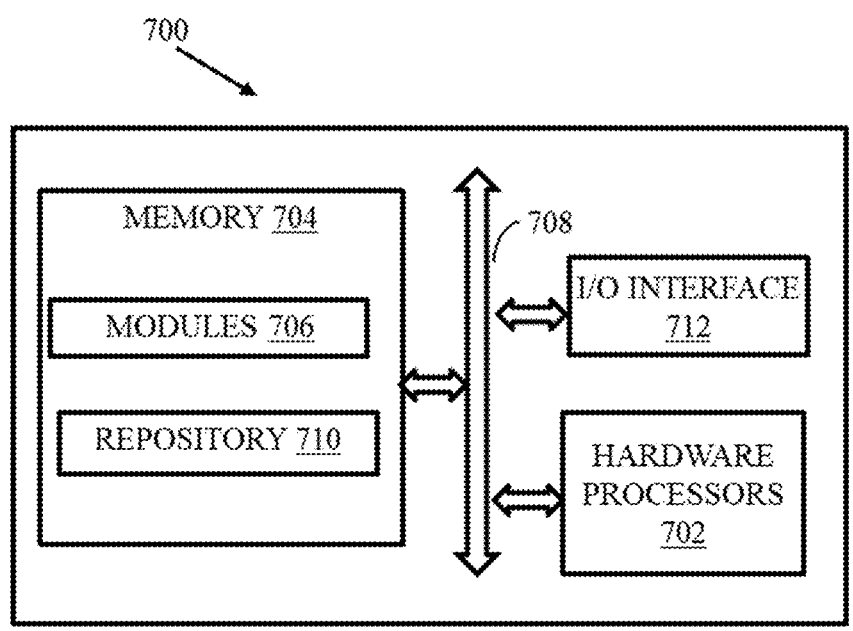
FIG. 7C is a functional block diagram of a system associated with the apparatus shown in FIG. 1A for executing a method for packing heterogeneous objects, according to some embodiments of the present disclosure.

The packing apparatus 100 further comprises a system 700 (not shown in FIG. 1A), for executing the associated method 900. FIG. 7C is a functional block diagram of the system associated with the apparatus shown in FIG. 1A for executing a method for packing heterogeneous objects, according to some embodiments of the present disclosure.

The system 700 includes a memory 704, one or more hardware processors 702, wherein the one or more hardware processors 702 may be either integrated within the packing apparatus 100, or connected to the packing apparatus 100 through an external interfaces. It may be understood that the memory 704, the one or more hardware processors 702, and/or one or more communication interfaces 708 may be comprised in the packing apparatus 100. The hardware processors 702, memory 704, and the Input/Output (I/O) interface 712 may be coupled by a system bus such as a system bus 708 or a similar mechanism.

The memory 704, may store instructions, any number of pieces of information, and data (e.g., a dimension, an orientation and a tracking code of each of the plurality of 3D objects), captured by the electronic device (e.g., a vision sensor), for example to implement the functions of the device 100. The memory 704 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory may be configured to store information, data, instructions or the like for enabling the apparatus 100 to carry out various functions in accordance with various example embodiments.

Additionally or alternatively, the memory 704 may be configured to store programmed instructions which when executed by the one or more hardware processors causes the packing apparatus 100 to behave in a manner as described in various embodiments. The memory stores the functional modules and information, for example, information (e.g., dimension and orientation of each of the plurality of 3D objects are obtained from the conveyor vision sensor and available space in the corresponding cuboidal bin is obtained from the corresponding bin vision sensor) received from the conveyor vision sensor and the corresponding bin vision sensors.

The one or more hardware processors 702 may be implemented as one or more microprocessors, microcontrollers, digital signal processors, central processing units, state machines, logic circuitries, and/or any devices that manipulate signals based on operational instructions. Further, the hardware processor may comprise a multi-core architecture. Among other capabilities, the hardware processor is configured to fetch and execute machine-readable instructions or modules stored in the memory. The hardware processor may include circuitry implementing, among others, audio and logic functions associated with the communication. For example, the hardware processor may include, but are not limited to, one or more digital signal processors (DSPs), one or more microprocessor, one or more special-purpose machine chips, one or more field-programmable gate arrays (FPGAs), one or more Application Specific Integrated Circuits (ASICs), one or more machine(s), various analog to digital converters, digital to analog converters, and/or other support circuits.

The one or more hardware processors 702 thus may also include the functionality to encode messages and/or data or information. The hardware processor may include, among others a clock, an Arithmetic Logic Unit (ALU) and logic gates configured to support operation of the hardware processor. Further, the hardware processor may include functionality to execute one or more software programs, which may be stored in the memory or otherwise accessible to the hardware processor.

The I/O interface 712 may include a variety of software and hardware interfaces, for example, a web interface, a graphical user interface, and the like. The I/O interface 712 may include a variety of software and hardware interfaces, for example, interfaces for peripheral device(s), such as a keyboard, a mouse, an external memory, a printer and the like. Further, the interface 712 may enable the system 700 to communicate with other devices, such as web servers and external databases.

The I/O interface 712 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 712 may include one or more ports for connecting a number of computing systems with one another or to another server computer. The I/O interface 712 may include one or more ports for connecting a number of devices to one another or to another server.

The plurality of modules 706 include programs or coded instructions that supplement applications or functions performed by the system 100 for packing heterogeneous objects. The plurality of modules 106, amongst other things, can include routines, programs, objects, components, and data structures, which performs particular tasks or implement particular abstract data types. The plurality of modules 106 may also be used as, signal processor(s), state machine(s), logic circuitries, and/or any other device or component that manipulates signals based on operational instructions. Further, the plurality of modules 706 can be used by hardware, by computer-readable instructions executed by the one or more hardware processors 702, or by a combination thereof. The plurality of modules 706 can include various sub-modules (not shown). The plurality of modules 706 may include computer-readable instructions that supplement applications or functions performed by the system 100 for packing heterogeneous objects.

The data repository 710 may include a plurality of abstracted piece of code for refinement and data that is processed, received, or generated as a result of the execution of the plurality of modules in the module(s) 706. Although the data repository 710 is shown internal to the system 700, it will be noted that, in alternate embodiments, the data repository 110 can also be implemented external to the system 700, where the data repository 710 may be stored within a database (not shown in FIG. 1) communicatively coupled to the system 700. The data contained within such external database may be periodically updated. For example, new data may be added into the database (not shown in FIG. 7C) and/or existing data may be modified and/or non-useful data may be deleted from the database (not shown in FIG. 7C). In one example, the data may be stored in an external system, such as a Lightweight Directory Access Protocol (LDAP) directory and a Relational Database Management System (RDBMS).

The programmed instructions stored in the memory 704 when executed by the one or more hardware processors 702 causes the packing apparatus 100 to receive the data pertaining to each of the plurality of 3D objects using the conveyor vision sensor associated with the primary conveyor 102, wherein the data comprising a length (l), a height (h), a width (w), the tracking code and the orientation of each of the plurality of 3D objects.

Further, the programmed instructions stored in the memory when executed by the one or more hardware processors causes the packing apparatus 100 to compute the dimension associated with each of the plurality of 3D objects based on the data.

Further, the programmed instructions stored in the memory when executed by the one or more hardware processors causes the packing apparatus 100 to simultaneously identify the cuboidal bin, corresponding to each of the plurality of 3D objects, from the plurality of cuboidal bins corresponding to each of a plurality of secondary conveyors by comparing the tracking code of each of plurality of 3D object with the code number of the each of the plurality of cuboidal bins. Each of the plurality of cuboidal bins is associated with a length (L), a width (W), a height (H) and the code number. The height (H) is segmented into a plurality of parts (p) based on one of, a height distribution of 3D objects and an associated expert knowledge. A plurality of layers corresponding to each of the plurality of cuboidal bins are determined based on the plurality of parts. Each of the plurality of layers is associated with a corresponding state space (as shown in FIG. 8A) forming a plurality of state spaces corresponding to each of the plurality of cuboidal bins. A plurality of cells in each of the plurality of state spaces is determined by dividing each of the plurality of state space into a plurality of rows (m) and a plurality of columns (n), wherein a sum of the plurality of rows is equivalent to the width (W) and a sum of the plurality of columns is equivalent to the length (L), and wherein each of the plurality of state spaces corresponding to each of the plurality of bins are initialized by filling each of the plurality of cells with zeros.

FIGS. 8A, 8B and 8C are exemplary state space representing available space of the cuboidal bin of the apparatus of FIG. 1A, in accordance with some embodiments of the present disclosure. Now referring to FIG. 8A, the state space includes 4 rows and 6 columns. The rows and columns are initially filled with zeros. Now referring to FIG. 8B, the rows 1, 2 and 3 and the columns 1, 2 and 3 of the state space are occupied by the object 504 and hence the rows 1, 2 and 3 and the columns 1, 2 and 3 are marked with ones indicating the mentioned rows and columns of the state space are occupied as shown in FIG. 8C.

Further, the programmed instructions stored in the memory when executed by the one or more hardware processors causes the packing apparatus 100 to simultaneously receive the space availability data of the identified cuboidal bin using a corresponding bin vision sensor. Each of the plurality of cuboidal bins is associated with the corresponding bin vision sensor.

Further, the programmed instructions stored in the memory when executed by the one or more hardware processors causes the packing apparatus 100 to simultaneously compute the dimension of an un-occupied space of the identified state space of the corresponding identified cuboidal bin based on the plurality of rows (m) and the plurality of columns (n) filled with zeros as shown in FIG. 8A.

Further, the programmed instructions stored in the memory when executed by the one or more hardware processors causes the packing apparatus 100 to compute the available bin space of the corresponding identified cuboidal bin based on the space availability data and the dimension of an un-occupied space.

Further, the programmed instructions stored in the memory when executed by the one or more hardware processors causes the packing apparatus 100 to compare the computed available bin space of the corresponding identified cuboidal bin and the dimension associated with the corresponding 3D object.

Further, the programmed instructions stored in the memory when executed by the one or more hardware processors causes the packing apparatus 100 to divert each of the plurality of 3D objects from the primary conveyor towards the corresponding un-occupied state space of the corresponding identified cuboidal bin through the corresponding secondary conveyor by: (i) raising the corresponding vertical plate 502 of the primary conveyor nearer to the available bin space of the corresponding identified cuboidal bin 106 and (ii) dropping the corresponding 3D object, for example 504 C on the free roller arrangement of a vertically movable horizontal frame 110 of the corresponding identified bin 106, when the dimension of the available bin space of the corresponding identified cuboidal bin and the dimension of the corresponding 3D object matches. If the dimension of the available bin space of the corresponding identified cuboidal bin and the dimension of the corresponding 3D object does not match, another cuboidal bin with same tracking code is identified and the 3D object can be dropped by using the above said procedure.

Further, the programmed instructions stored in the memory when executed by the one or more hardware processors causes the packing apparatus 100 to update the corresponding occupied state space with ones based on the space availability data obtained from the bin vision sensor of the identified cuboidal bin after placing the 3D object, for example, 504 C.

Further, the programmed instructions stored in the memory when executed by the one or more hardware processors causes the packing apparatus 100 to update a position of the vertically movable horizontal frame of the identified bin to the next layer based on the plurality of parts, when the corresponding state space is occupied. The position of the vertically movable horizontal frame of the identified cuboidal bin is updated until the corresponding identified cuboidal bin is full. Further, the free rolling fixture of the vertically movable horizontal frame retracts and the hanging part of a corresponding rolling shutter rolls up when the corresponding identified cuboidal bin is full.

Figure 9A:
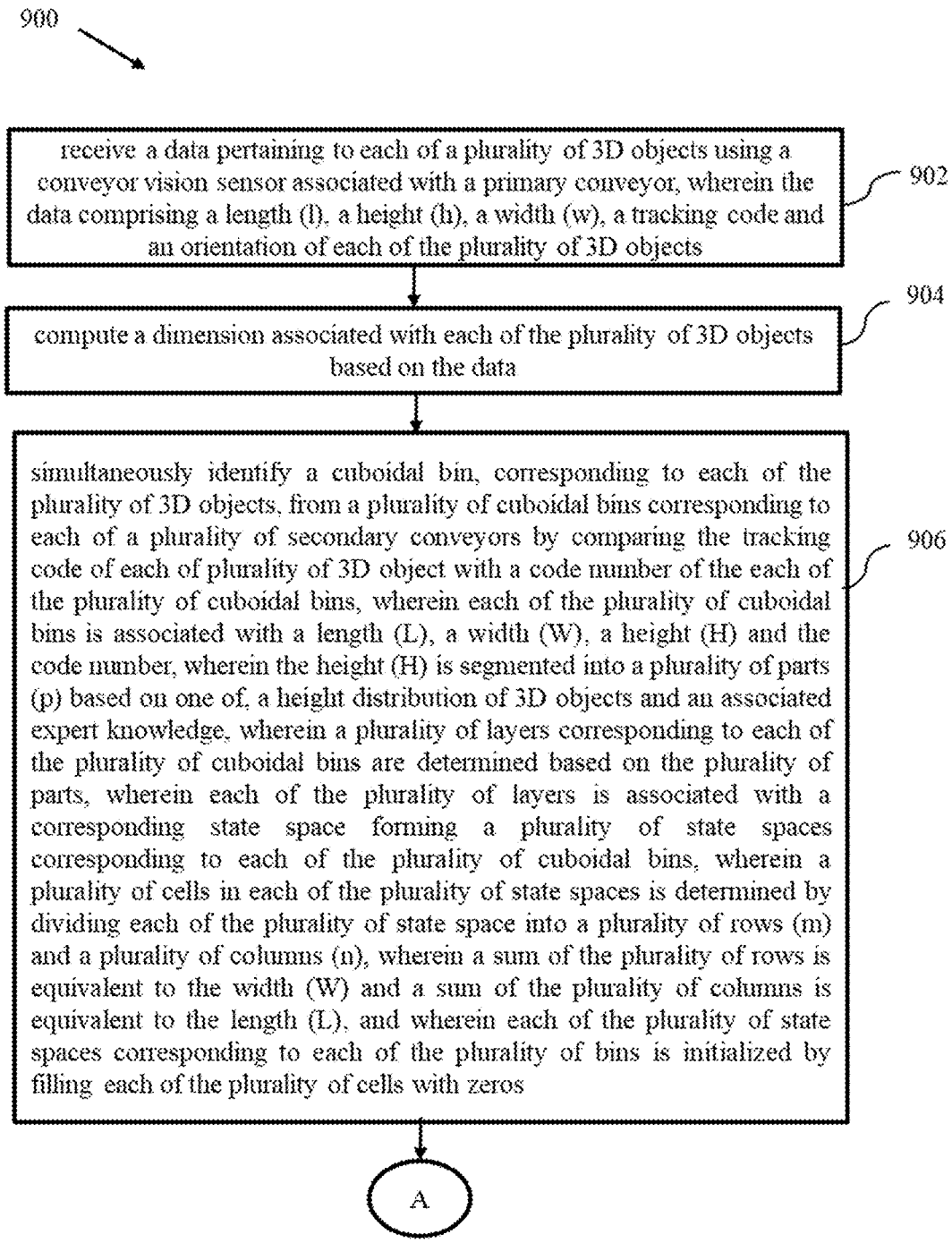
FIGS. 9A, 9B and 9C are exemplary flow diagrams illustrating a processor implemented method for packing heterogeneous objects with reference to FIGS. 1A through 7B, in accordance with some embodiments of the present disclosure.
Figure 9B:
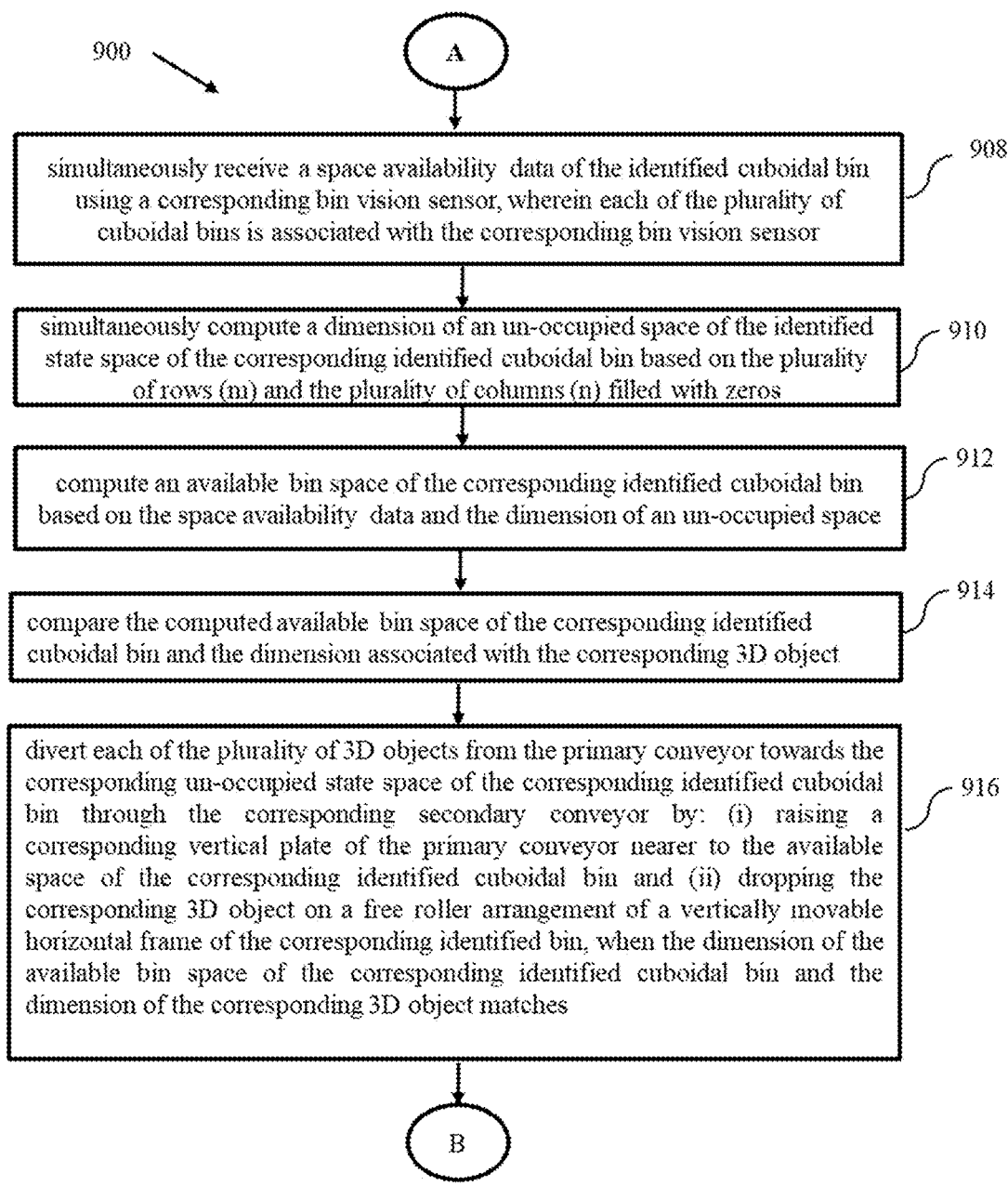
Figure 9C:
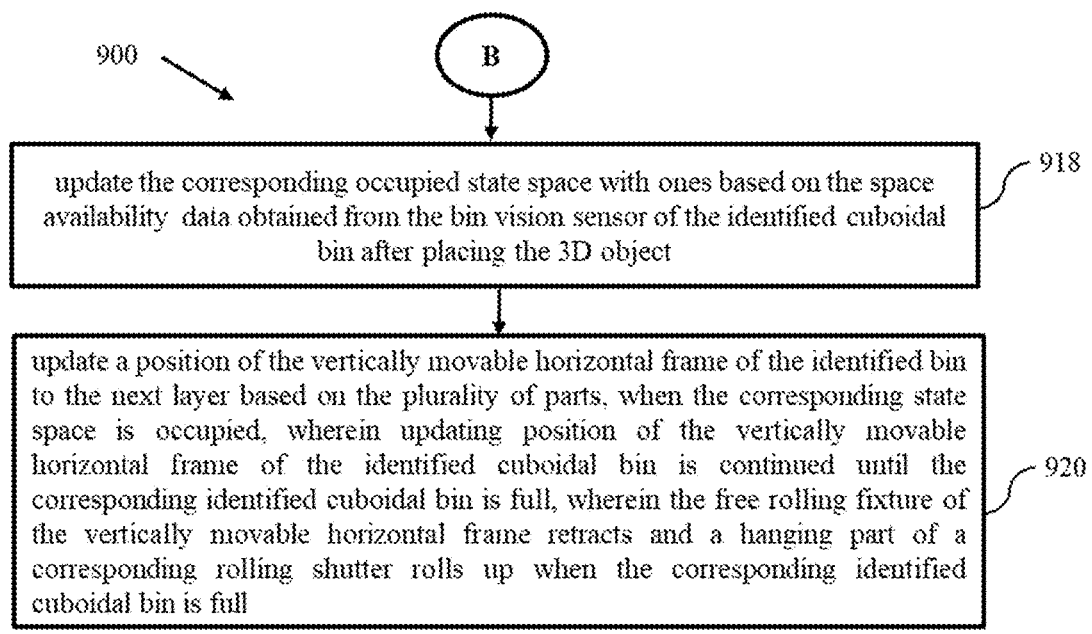

FIGS. 9A, 9B and 9C are exemplary flow diagrams illustrating a processor implemented method for packing heterogeneous objects with reference to FIGS. 1A through 7B, in accordance with some embodiments of the present disclosure.

In an embodiment, the system 100 comprises one or more data storage devices or the memory operatively coupled to the one or more hardware processor(s) and is configured to store instructions for execution of steps of the method 900 by the one or more hardware processors. The steps of the method 900 of the present disclosure will now be explained with reference to the components or blocks of the system 100 as depicted in FIG. 1A and the steps of flow diagram as depicted in FIG. 9A, 9B and FIG. 9C. The method 900 may be described in the general context of computer executable instructions. Generally, computer executable instructions can include routines, programs, objects, components, data structures, procedures, modules, functions, etc., that perform particular functions or implement particular abstract data types. The method 900 may also be practiced in a distributed computing environment where functions are performed by remote processing devices that are linked through a communication network. The order in which the method 900 is described is not intended to be construed as a limitation, and any number of the described method blocks can be combined in any order to implement the method 900, or an alternative method. Furthermore, the method 900 can be implemented in any suitable hardware, software, firmware, or combination thereof.

At step 902 of the method 900, the one or more hardware processors receive the data pertaining to each of a plurality of 3D objects using the conveyor vision sensor associated with the primary conveyor, wherein the data includes the length (l), the height (h), the width (w), the tracking code and the orientation of each of the plurality of 3D objects. The tracking code comprises one of, a one dimensional bar code and a two dimensional barcode. For example, bar codes.

At step 904 of the method 900, the one or more hardware processors compute the dimension associated with each of the plurality of 3D objects based on the data.

At 906 of the method 900, the one or more hardware processors 102 simultaneously identify the cuboidal bin, corresponding to each of the plurality of 3D objects, from the plurality of cuboidal bins corresponding to each of the plurality of secondary conveyors by comparing the tracking code of each of plurality of 3D object with the code number of the each of the plurality of cuboidal bins, wherein each of the plurality of cuboidal bins is associated with the length (L), the width (W), the height (H) and the code number, wherein the height (H) is segmented into the plurality of parts (p) based on one of, the height distribution of 3D objects and an associated expert knowledge. The plurality of layers corresponding to each of the plurality of cuboidal bins are determined based on the plurality of parts and each of the plurality of layers is associated with the corresponding state space as shown in FIGS. 8A to 8C forming the plurality of state spaces corresponding to each of the plurality of cuboidal bins. The plurality of cells in each of the plurality of state spaces is determined by dividing each of the plurality of state space into the plurality of rows (m) and the plurality of columns (n). The sum of the plurality of rows is equivalent to the width (W) and the sum of the plurality of columns is equivalent to the length (L). Each of the plurality of state spaces corresponding to each of the plurality of bins is initialized by filling each of the plurality of cells with zeros.

At 908 of the method 900, the one or more hardware processors simultaneously receive the space availability data of the identified cuboidal bin using the corresponding bin vision sensor. Each of the plurality of cuboidal bins is associated with the corresponding bin vision sensor.

At 910 of the method 900, the one or more hardware processors simultaneously compute the dimension of the unoccupied space of the identified state space of the corresponding identified cuboidal bin based on the plurality of rows (m) and the plurality of columns (n) filled with zeros.

At 912 of the method 900, the one or more hardware processors compute the available bin space of the corresponding identified cuboidal bin based on the space availability data and the dimension of an un-occupied space.

At 914 of the method 900, the one or more hardware processors compare the computed available bin space of the corresponding identified cuboidal bin and the dimension associated with the corresponding 3D object.

At 916 of the method 900, the one or more hardware processors divert each of the plurality of 3D objects from the primary conveyor towards the corresponding un-occupied state space of the corresponding identified cuboidal bin through the corresponding secondary conveyor by: (i) raising the corresponding vertical plate of the primary conveyor nearer to the available space of the corresponding identified cuboidal bin. Each vertical plate of the primary conveyor is configured to raise when the dimension of the corresponding available bin space and the dimension of the corresponding 3D object matches and (ii) dropping the corresponding 3D object on the free roller arrangement of the vertically movable horizontal frame of the corresponding identified bin, when the dimension of the available bin space of the corresponding identified cuboidal bin and the dimension of the corresponding 3D object matches. The vertically movable horizontal frame of each cuboidal bin is configured to update its position until the cuboidal bin is full.

At 918 of the method 900, the one or more hardware processors update the corresponding occupied state space with ones based on the space availability data obtained from the bin vision sensor of the identified cuboidal bin after placing the 3D object.

At 920 of the method 900, the one or more hardware processors update the position of the vertically movable horizontal frame of the identified bin to the next layer based on the plurality of parts, when the corresponding state space is occupied. The updating position of the vertically movable horizontal frame of the identified cuboidal bin is continued until the corresponding identified cuboidal bin is full. Further, the free rolling fixture of the vertically movable horizontal frame retracts and a hanging part of the corresponding rolling shutter rolls up when the corresponding identified cuboidal bin is full.

Figure 10:
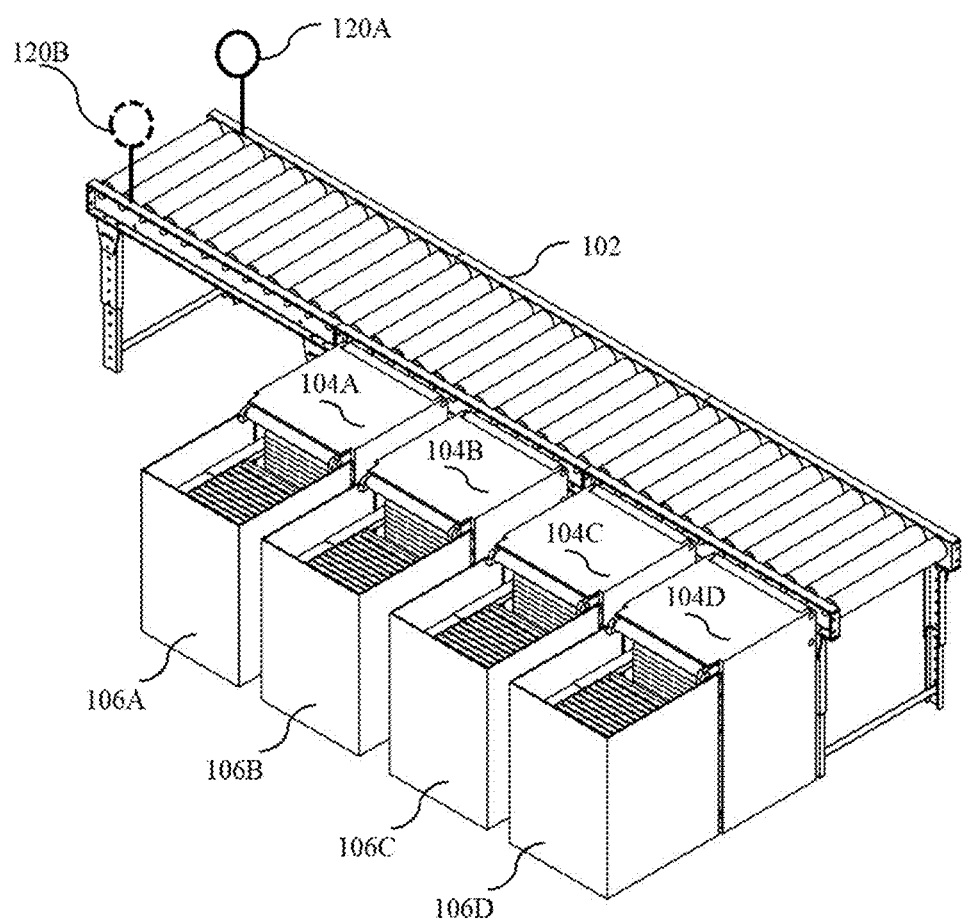
FIG. 10 illustrates a 3D view of the apparatus of FIG. 1A for packing heterogeneous 3D objects with a plurality of telescopic secondary conveyors and a plurality of cuboidal bins, in accordance with some embodiments of the present disclosure.

FIG. 10 illustrates a 3D view of the apparatus of FIG. 1A for packing heterogeneous 3D objects with a plurality of telescopic secondary conveyors and a plurality of cuboidal bins, in accordance with some embodiments of the present disclosure. Now referring to FIG. 10, the apparatus for packing heterogeneous objects include the plurality of telescopic secondary conveyors 104A, 104B, 104C and 104D with the corresponding cuboidal bins 106A, 106B, 106C and 106D.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of automatically packing heterogeneous 3D objects in a space and time efficient manner. The apparatus 100 and the method 900 associated with the apparatus 100 is capable of solving the dynamic 3D bin packing problem. Here, the 3D objects are packed in the cuboidal bins in an arranged manner without wasting bin space. Further, the packing time is reduced with the help of the associated method 900.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A packing apparatus, the apparatus comprising:
a primary conveyor (102) with a first end (126) and a second end (128) capable of receiving a plurality of 3 dimensional (3D) objects, wherein the primary conveyor (102) comprises a plurality of rollers (112) and a plurality of vertical plates (502) corresponding to each of the plurality of rollers (112), wherein each of the plurality of vertical plates (502) are capable of raising and diverting each of the plurality of 3D objects to a corresponding secondary conveyor (104);
a conveyor vision sensor (120 A) attached at the first end (126) of the primary conveyor (102) capable of measuring a plurality of dimensions and an orientation of each of the plurality of 3D objects, wherein the conveyor vision sensor (120 A) is capable of reading a tracking code associated with each of the plurality of 3D objects;
a plurality of telescopic secondary conveyors (104) having a bin end (130) and a primary conveyor end (132), wherein the bin end (130) is associated with a rolling shutter arrangement (114), wherein the primary conveyor end (132) is detachably attached with at least one side of the primary conveyor (102), and wherein each of the plurality of telescopic secondary conveyors (104) and the primary conveyor (102) are of equal height;
a scissor lift mechanism (118) placed below the rolling shutter arrangement (114) with an upper end supporting a vertically movable horizontal frame (110) and a lower end fixed on a free rolling fixture (116) capable of moving forward and backward directions,
wherein the vertically movable horizontal frame (110) comprises a front end (206), a rear end (210) and a middle part (208), wherein a portion between the front end (206) and the middle part (208) is capable of fitting inside a cuboidal bin (106) without touching an inner part of the cuboidal bin (106),
wherein the portion between the front end (206) and the middle part (208) is a free roller capable of providing a gravity support to a dropped 3D object and capable of dropping the 3D objects into the corresponding cuboidal bin (106) by rolling when the corresponding cuboidal bin (106) is full,
wherein the free roller is capable of moving freely between a maximum upper position and a maximum lower position inside the corresponding cuboidal bin (106) without touching the inner part of the cuboidal bin (106),
wherein the portion between the middle part (208) and the rear end (210) is vacant, wherein a hanging part (108) of the rolling shutter arrangement (114) hangs in the vacant middle portion of the vertically movable horizontal frame (110) by touching the middle part (208) to avoid dropped 3D objects from falling out of a corresponding cuboidal bin (106), and
wherein the vertically movable horizontal frame (110) is capable of moving in both forward and backward directions in telescopic movement;
the cuboidal bin (106) corresponding to each of the plurality of telescopic secondary conveyor (104) is associated with a corresponding code number,
wherein the cuboidal bin (106) is placed at the bin end (130) of the corresponding telescopic secondary conveyor (104), wherein the top of the cuboidal bin (106) is open for dropping 3D objects,
wherein one side of the cuboidal bin (106) is open towards the bin end (130) of the corresponding secondary conveyor (104) through which the free roller of the vertically movable horizontal frame (110) is capable of moving freely between the maximum upper position and the maximum lower position inside the corresponding cuboidal bin (106) without touching the inner part of the cuboidal bin (106); and a plurality of bin vision sensors corresponding to each cuboidal bin (106).

2. The packing apparatus of claim 1, wherein the tracking code comprises one of, a one dimensional bar code and a two dimensional barcode.

3. A processor implemented method, the method comprising:
receiving data pertaining to each of a plurality of 3D objects using a conveyor vision sensor associated with a primary conveyor, wherein the data comprising a length (l), a height (h), a width (w), a tracking code and an orientation of each of the plurality of 3D objects;
computing a dimension associated with each of the plurality of 3D objects based on the data;
simultaneously identifying a cuboidal bin, corresponding to each of the plurality of 3D objects, from a plurality of cuboidal bins corresponding to each of a plurality of secondary conveyors by comparing the tracking code of each of plurality of 3D object with a code number of the each of the plurality of cuboidal bins,
wherein each of the plurality of cuboidal bins is associated with a length (L), a width (W), a height (H) and the code number,
wherein the height (H) is segmented into a plurality of parts (p) based on one of, a height distribution of 3D objects and an associated expert knowledge,
wherein a plurality of layers corresponding to each of the plurality of cuboidal bins are determined based on the plurality of parts,
wherein each of the plurality of layers is associated with a corresponding state space forming a plurality of state spaces corresponding to each of the plurality of cuboidal bins,
wherein a plurality of cells in each of the plurality of state spaces is determined by dividing each of the plurality of state space into a plurality of rows (m) and a plurality of columns (n), wherein a sum of the plurality of rows is equivalent to the width (W) and a sum of the plurality of columns is equivalent to the length (L), and
wherein each of the plurality of state spaces corresponding to each of the plurality of bins is initialized by filling each of the plurality of cells with zeros;
simultaneously receiving a space availability data of the identified cuboidal bin using a corresponding bin vision sensor, wherein each of the plurality of cuboidal bins is associated with the corresponding bin vision sensor;
simultaneously computing a dimension of an un-occupied space of the identified state space of the corresponding identified cuboidal bin based on the plurality of rows (m) and the plurality of columns (n) filled with zeros;
computing an available bin space of the corresponding identified cuboidal bin based on the space availability data and the dimension of an un-occupied space;
comparing the computed available bin space of the corresponding identified cuboidal bin and the dimension associated with the corresponding 3D object;

diverting each of the plurality of 3D objects from the primary conveyor towards the corresponding un-occupied state space of the corresponding identified cuboidal bin through the corresponding secondary conveyor by:
- raising a corresponding vertical plate of the primary conveyor nearer to the available bin space of the corresponding identified cuboidal bin; and
- dropping the corresponding 3D object on a free roller arrangement of a vertically movable horizontal frame of the corresponding identified bin, when the dimension of the available bin space of the corresponding identified cuboidal bin and the dimension of the corresponding 3D object matches;

updating the corresponding occupied state space with ones based on the space availability data obtained from the bin vision sensor of the identified cuboidal bin after placing the 3D object; and updating a position of the vertically movable horizontal frame of the identified bin to a next layer based on the plurality of parts, when the corresponding state space is occupied, wherein updating the position of the vertically movable horizontal frame of the identified cuboidal bin is continued until the corresponding identified cuboidal bin is full, wherein the free rolling fixture of the vertically movable horizontal frame retracts and a hanging part of a corresponding rolling shutter rolls up when the corresponding identified cuboidal bin is full.

4. The processor implemented method of claim 3, wherein each vertical plate of the primary conveyor is raised when the dimension of the corresponding available bin space and the dimension of the corresponding 3D object matches.

5. The processor implemented method of claim 3, wherein another cuboidal bin is identified when there is a mismatch between the dimension of the available bin space of the corresponding identified cuboidal bin and the dimension of the corresponding 3D object.

6. The processor implemented method of claim 3, wherein the vertically movable horizontal frame of each cuboidal bin is configured to update its position until the cuboidal bin is full.

7. The processor implemented method of claim 3, wherein the free rolling fixture of the vertically movable horizontal frame is configured to retract when the corresponding cuboidal bin is full.

8. The processor implemented method of claim 3, wherein the hanging part of the rolling shutter of the corresponding secondary conveyor is configured to roll up when the corresponding cuboidal bin is full.

9. The processor implemented method of claim 3, wherein the tracking code comprises one of, a one dimensional bar code and a two dimensional barcode.

10. A non-transitory computer readable medium embodying a program executable in a computing device for executing a method for packing heterogeneous objects, the program comprising:
- receiving data pertaining to each of a plurality of 3D objects using a conveyor vision sensor associated with a primary conveyor, wherein the data comprising a length (l), a height (h), a width (w), a tracking code and an orientation of each of the plurality of 3D objects;
- computing a dimension associated with each of the plurality of 3D objects based on the data;
- simultaneously identifying a cuboidal bin, corresponding to each of the plurality of 3D objects, from a plurality of cuboidal bins corresponding to each of a plurality of secondary conveyors by comparing the tracking code of each of plurality of 3D object with a code number of the each of the plurality of cuboidal bins,
  wherein each of the plurality of cuboidal bins is associated with a length (L), a width (W), a height (H) and the code number,
  wherein the height (H) is segmented into a plurality of parts (p) based on one of, a height distribution of 3D objects and an associated expert knowledge,
  wherein a plurality of layers corresponding to each of the plurality of cuboidal bins are determined based on the plurality of parts,
  wherein each of the plurality of layers is associated with a corresponding state space forming a plurality of state spaces corresponding to each of the plurality of cuboidal bins,
  wherein a plurality of cells in each of the plurality of state spaces is determined by dividing each of the plurality of state space into a plurality of rows (m) and a plurality of columns (n), wherein a sum of the plurality of rows is equivalent to the width (W) and a sum of the plurality of columns is equivalent to the length (L), and
  wherein each of the plurality of state spaces corresponding to each of the plurality of bins is initialized by filling each of the plurality of cells with zeros;
- simultaneously receiving a space availability data of the identified cuboidal bin using a corresponding bin vision sensor, wherein each of the plurality of cuboidal bins is associated with the corresponding bin vision sensor;
- simultaneously computing a dimension of an un-occupied space of the identified state space of the corresponding identified cuboidal bin based on the plurality of rows (m) and the plurality of columns (n) filled with zeros;
- computing an available bin space of the corresponding identified cuboidal bin based on the space availability data and the dimension of an un-occupied space;
- comparing the computed available bin space of the corresponding identified cuboidal bin and the dimension associated with the corresponding 3D object;
- diverting each of the plurality of 3D objects from the primary conveyor towards the corresponding un-occupied state space of the corresponding identified cuboidal bin through the corresponding secondary conveyor by:
  - raising a corresponding vertical plate of the primary conveyor nearer to the available bin space of the corresponding identified cuboidal bin; and
  - dropping the corresponding 3D object on a free roller arrangement of a vertically movable horizontal frame of the corresponding identified bin, when the dimension of the available bin space of the corresponding identified cuboidal bin and the dimension of the corresponding 3D object matches;
- updating the corresponding occupied state space with ones based on the space availability data obtained from the bin vision sensor of the identified cuboidal bin after placing the 3D object; and
- updating a position of the vertically movable horizontal frame of the identified bin to a next layer based on the plurality of parts, when the corresponding state space is occupied, wherein updating the position of the vertically movable horizontal frame of the identified cuboidal bin is continued until the corresponding identified cuboidal bin is full, wherein the free rolling fixture of the vertically movable horizontal frame retracts and a hanging part of a corresponding rolling shutter rolls up when the corresponding identified cuboidal bin is full.

* * * * *